United States Patent
Sukegawa et al.

(10) Patent No.: US 7,369,764 B1
(45) Date of Patent: May 6, 2008

(54) TRANSMISSION LINE MONITORING METHOD AND APPARATUS

(75) Inventors: Kiyoshi Sukegawa, Kawasaki (JP); Yasuhiro Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/441,083

(22) Filed: Nov. 16, 1999

(30) Foreign Application Priority Data

Feb. 19, 1999 (JP) .................................. 11-042290

(51) Int. Cl.
  *H04B 10/08* (2006.01)
(52) U.S. Cl. .............................. 398/33; 398/10; 398/17
(58) Field of Classification Search ................ 359/110, 359/127, 132, 168, 173; 398/10, 17, 30–31, 398/33, 67, 72, 32, 34
  See application file for complete search history.

(56) References Cited

U.S. PATENT DOCUMENTS

| | | | |
|---|---|---|---|
| 5,790,289 A * | 8/1998 | Taga et al. ................... | 359/110 |
| 5,923,453 A * | 7/1999 | Yoneyama ................... | 359/110 |
| 5,995,254 A * | 11/1999 | Koga et al. .................. | 359/110 |
| 6,115,155 A * | 9/2000 | Liu et al. ..................... | 359/110 |
| 6,288,809 B1 * | 9/2001 | Touma et al. .................. | 398/9 |
| 6,307,652 B1 * | 10/2001 | Fassih-Nia et al. ......... | 359/110 |
| 6,404,525 B1 * | 6/2002 | Shimomura et al. ........ | 359/110 |
| 6,879,619 B1 * | 4/2005 | Green et al. ................. | 372/98 |
| 2002/0015200 A1 * | 2/2002 | Jennings et al. ............ | 359/124 |

FOREIGN PATENT DOCUMENTS

| | | |
|---|---|---|
| JP | 60-177238 | 9/1985 |
| JP | 11-28031 | 5/1989 |
| JP | 02-143619 | 6/1990 |
| JP | 03-249828 | 11/1991 |
| JP | 8-265260 | 10/1996 |
| JP | 10-224352 | 8/1998 |

OTHER PUBLICATIONS

Japanese Office Action mailed Jul. 11, 2006 regarding Japanese patent application No. 11-042290 (3 pgs).

* cited by examiner

*Primary Examiner*—Dzung Tran
(74) *Attorney, Agent, or Firm*—Staas & Halsey LLP

(57) ABSTRACT

A transmission line monitoring apparatus includes a first optical coupling unit, a first optical dividing unit, a second optical coupling unit, a second optical dividing unit and a monitoring unit. The first optical coupling unit couples a down data signal with a first wavelength and an examination signal with a second wavelength into a first coupled signal. The first optical dividing unit receives the first coupled signal and divides the first coupled signal into the down data signal with the first wavelength and the examination signal with the second wavelength. The second optical coupling unit couples an up data signal with the first wavelength and the examination signal from the first optical dividing unit into a second coupled signal. The second optical dividing unit receives the second coupled signal and divides the second coupled signal into the up data signal with the first wavelength and the examination signal with the second wavelength. The monitoring unit monitors a fault and a position of the fault.

23 Claims, 21 Drawing Sheets

FIG. 20

AN EXAMPLE OF A FORMATTED
EXAMINATION CONTROL
COMMAND SIGNAL

| CO 1 | CO 2 | CO 3 | CO 4 | CO 5 | CO 6 | ... |

EXAMPLE
  CO1  ...  OPTICAL TRANSMITTING LINE EXAMINATION INFORMATION
    "0" ⇨ STOP
    "1" ⇨ START

EXAMPLE
  CO2  ...  EXAMINATION INFORMATION AT GIVEN INTERVALS
    "0" ⇨ STOP
    "1" ⇨ START AG GIVEN INTERVALS

TRANSMISSION LINE MONITORING METHOD AND APPARATUS

BACKGROUND OF THE INVENTION

1. Field of the Invention

The present invention generally relates to a transmission line method and apparatus, and more particularly to a transmission line monitoring method and apparatus which can pinpoint where a fault occurs among apparatus connected by optical transmission lines.

2. Description of the Related Art

Recently, a network of optical fibers has been laid near to user's houses. This kind of optical fiber network has a maintenance management function of roughly specifying where a fault is when the fault occurs.

For example, the maintenance management function is described with reference to FIG. 1 showing a conventional transmission line monitoring apparatus. The conventional apparatus comprises a service station 10, a user house 20, an optical fiber transmission down line 40 and an optical fiber transmission up line 42.

The service station 10 includes a station apparatus 12 such as an optical terminal apparatus disposed therein. The user house 20 includes a terminal apparatus 22 and an in-house apparatus 24 such as a DSU (Digital Service Unit) with an optical/electric converting function. In general, the station apparatus 12 is referred to as a host apparatus and the in-house apparatus 24 as a lower apparatus.

For example, the station apparatus 12 and in-house apparatus 24 both have return points for distinguishing a location of a fault. In particular, the in-house apparatus 24 has a return point near the terminal apparatus 22, and, at this return point, it can be distinguished whether the fault has occurred in the terminal apparatus 22 or on the host side including the in-house apparatus 24 and the host apparatus 12.

At the return point of the in-house apparatus 24, an optical-to-electric converter 28 converts an optical signal received from the station apparatus 12 into an electric signal. The converted electric signal is transmitted to an electric/optical converter 30 via a returning processor 26. Then the electric/optical converter 30 converts the received electric signal into an optical signal and the converted optical signal is further transmitted to the station apparatus 12.

In a case in which an out-of-phase of a received signal or an abnormality of the transmission up line 42 is detected in the station apparatus 12, it can be confirmed that a fault has occurred in the in-house apparatus 24 or in the optical fiber transmission up line 42. In this case, it is needed to go to the user house 20 to change the in-house apparatus 24 disposed therein. After that, if the fault is removed, then it can be determined that the fault occurred in the in-house apparatus 24. If the fault is not removed even after the in-house apparatus 24 is changed, then it is needed to go to check the optical fiber transmission up line 42.

In a case in which an out-of-phase of a received signal or an abnormality of the transmission down line 40 is detected in the user house 20, it can be confirmed that a fault has occurred in the in-house apparatus 24 or in the optical fiber transmission down line 40. In this case, it is needed to go to the user house 20 to change the in-house apparatus 24 disposed therein. After that, if the fault is removed, it can be determined that the fault occurred in the in-house apparatus 24. If the fault is not removed even after the in-house apparatus 24 is changed, then it is needed to go to check the optical fiber transmission down line 40.

As mentioned above, at the return point of the in-house apparatus 24, it can be distinguished whether a fault position is in the terminal 22 or on its host side including the in-house apparatus 24. Further, at the return point of the station apparatus 12, it can be distinguished whether a fault-occurring position is on the host side of the station apparatus 12, or on the lower side including the in-house apparatus 24, the optical fiber transmission down line 40 and the optical fiber transmission up line 42.

However, at the return points of the conventional transmission line monitoring apparatus, a fault position cannot be distinguished between the in-house apparatus 24 and the optical fiber transmission down and up lines 40, 42.

Hence, in a case where a fault occurs in any one of the in-house apparatus 24, the optical fiber transmission down line 40, and the optical fiber transmission up line 42, a position of the fault cannot be accurately determined without performing a field survey. Performing such a field survey increases man-hours.

Furthermore, if a power supply of the in-house apparatus 24 in the user house 20 is disconnected, the conventional transmission line monitoring apparatus cannot work normally.

SUMMARY OF THE INVENTION

It is a general object of the present invention to provide a transmission line monitoring method and apparatus by which method and apparatus the above disadvantages are eliminated.

A more specific object of the present invention is to provide a transmission line monitoring method and apparatus, by which method and apparatus it can be distinctively determined whether a fault occurs in an in-house apparatus or in an optical transmission line without the need to go to check a power state of the in-house apparatus.

The above objects and other objects of the present invention are achieved by a transmission line monitoring apparatus for monitoring faults occurred in a transmission line and in apparatus connected to the transmission line, the transmission line monitoring apparatus comprising:

a first optical coupling unit which couples a down data signal of a first wavelength and an examination signal of a second wavelength so as to transmit a first coupled signal to a lower apparatus;

a first optical dividing unit which receives the first coupled signal from the optical coupling unit so as to divide the first coupled signal into the down data signal with the first wavelength and the examination signal with the second wavelength;

a second optical coupling unit which couples an up data signal with the first wavelength and the examination signal from the first optical dividing unit so as to transmit a second coupled signal toward a host apparatus;

a second optical dividing unit which receives the second coupled signal from the second optical coupling unit so as to divide the second coupled signal into the up data signal with the first wavelength and the examination signal with the second wavelength; and a monitoring unit which monitors a fault and a location of the fault.

Thus, a construction consisting of the host apparatus, the optical transmission line and the lower apparatus can carry out an optical signal return examination. Hence, when a fault occurs, it is easy to distinguish whether the fault occurs in the optical transmission line or in the lower apparatus.

For example, in a case where maintenance of the optical transmission line and the lower apparatus is managed by a method of the related art, it is needed to perform a fault distinction by a field survey. According to the present invention, since the fault distinction can be performed beforehand, it is possible to rapidly handle the fault and save cost without the field survey.

The transmission line monitoring apparatus may be configured such that the first optical coupling unit, the first optical dividing unit, the second optical coupling unit, and the second optical dividing unit are formed of passive elements.

Thus, the fault can be distinguished without the need to go to check a power state of the lower apparatus.

The transmission line monitoring apparatus may further comprise a first examination signal generator for generating the examination signal with the second wavelength.

Thus, the fault can be distinguished without affecting the data signal with the first wavelength.

The transmission line monitoring apparatus may be configured such that the monitoring unit includes an alarm information output unit which monitors a signal level of the examination signal with the second wavelength so as to output alarm information if the signal level is lower than a predetermined signal level; and an alarm information displaying/transferring unit which, when the alarm information is outputted, displays the alarm information and inserts the alarm information into the up data signal to be transmitted to the host apparatus.

Thus, faults occurring in the optical transmission line, the host apparatus, and the lower apparatus can be detected. Furthermore, when the faults are detected, alarm information about the faults is displayed by the display unit such as an LED or the like and is transmitted to a host side by inserting the alarm information into the up data signal to be sent to the host side.

The transmission line monitoring apparatus may further comprise a second examination signal generator which divides an input down data signal into two signals, one signal being converted into the down data signal with the first wavelength, the other signal being converted into the examination signal with the second wavelength.

Thus, a circuit for generating the examination signal with the second wavelength can be simplified.

The transmission line monitoring apparatus may be configured such that the monitoring unit includes:

an error information output unit which generates an original down data signal from the examination signal with the second wavelength and, based on the original down data signal, outputs synchronous error information and data signal error information; and an error information displaying/transferring unit which, when the synchronous error information and the data signal error information are outputted, displays the error information and inserts the error information into the up data signal to be transmitted to the host apparatus.

Thus, it is possible to output the synchronous error information for monitoring an abnormality in a transmission line and the data signal error information for monitoring a transmission line state such as a transmission line inferior state or the like.

Further, in a case where a fault has been detected, the error information can be displayed by an LED or the like and transmitted to the host side by inserting the error information into the up data signal to be transmitted to the host side.

The transmission line monitoring apparatus may further comprise a first control unit which controls start and stop of the first examination signal generator.

Thus, it is possible to save power by stopping the first examination signal generator in a case where the transmission line monitoring apparatus of the present invention is not needed.

The transmission line monitoring apparatus may further comprise a second control unit which controls start and stop of the alarm information output unit and start and stop of the alarm information displaying/transferring unit.

Thus, it is possible to save power by stopping the alarm information output unit and alarm information displaying/transferring unit in a case where the transmission line monitoring apparatus of the present invention is not needed.

The transmission line monitoring apparatus may further comprise a timer which manages the first control unit at given intervals.

Thus, the transmission line monitoring apparatus of the present invention can be operated at the given intervals.

The transmission line monitoring apparatus may further comprise a command detecting unit which detects a command signal included in the down data signal so as to manage the first control unit based on the command signal.

Thus, an apparatus further positioned on a higher side can control the transmission line monitoring apparatus of the present invention. Hence, it is possible to save power because an optical transmission line may be monitored only when the host apparatus judges that it is needed to monitor the transmission line.

The above-mentioned objects of the present invention can be obtained by a transmission line monitoring method for monitoring faults occurred in a transmission line and in apparatus connected to the transmission line. The transmission line monitoring method comprises the steps of:

(a) coupling a down data signal with a first wavelength and an examination signal with a second wavelength so as to transmit a first coupled signal to a lower apparatus;

(b) receiving the first coupled signal and dividing the first coupled signal into the down data signal with the first wavelength and the examination signal with the second wavelength;

(c) coupling an up data signal with the first wavelength and the examination signal with the second wavelength so as to transmit a second coupled signal towards a host apparatus;

(d) receiving the second coupled signal and dividing the second coupled signal into the up data signal with the first wavelength and the examination signal with the second wavelength; and (e) monitoring a fault and a location of the fault.

Thus, a construction consisting of the host apparatus, the optical transmission line and the lower apparatus can carry out an optical signal return examination. Hence, it is easy to distinguish whether the fault occurred in the optical transmission line or in the lower apparatus.

Other objects, features and advantages of the present invention will become more apparent from the following detailed description when read in conjunction with the accompanying drawings.

BRIEF DESCRIPTION OF THE DRAWINGS

FIG. 20 is a block diagram for illustrating an examination control command signal of the seventh embodiment according to the present invention.

DETAILED DESCRIPTION OF THE PREFERRED EMBODIMENTS

Figure 2:
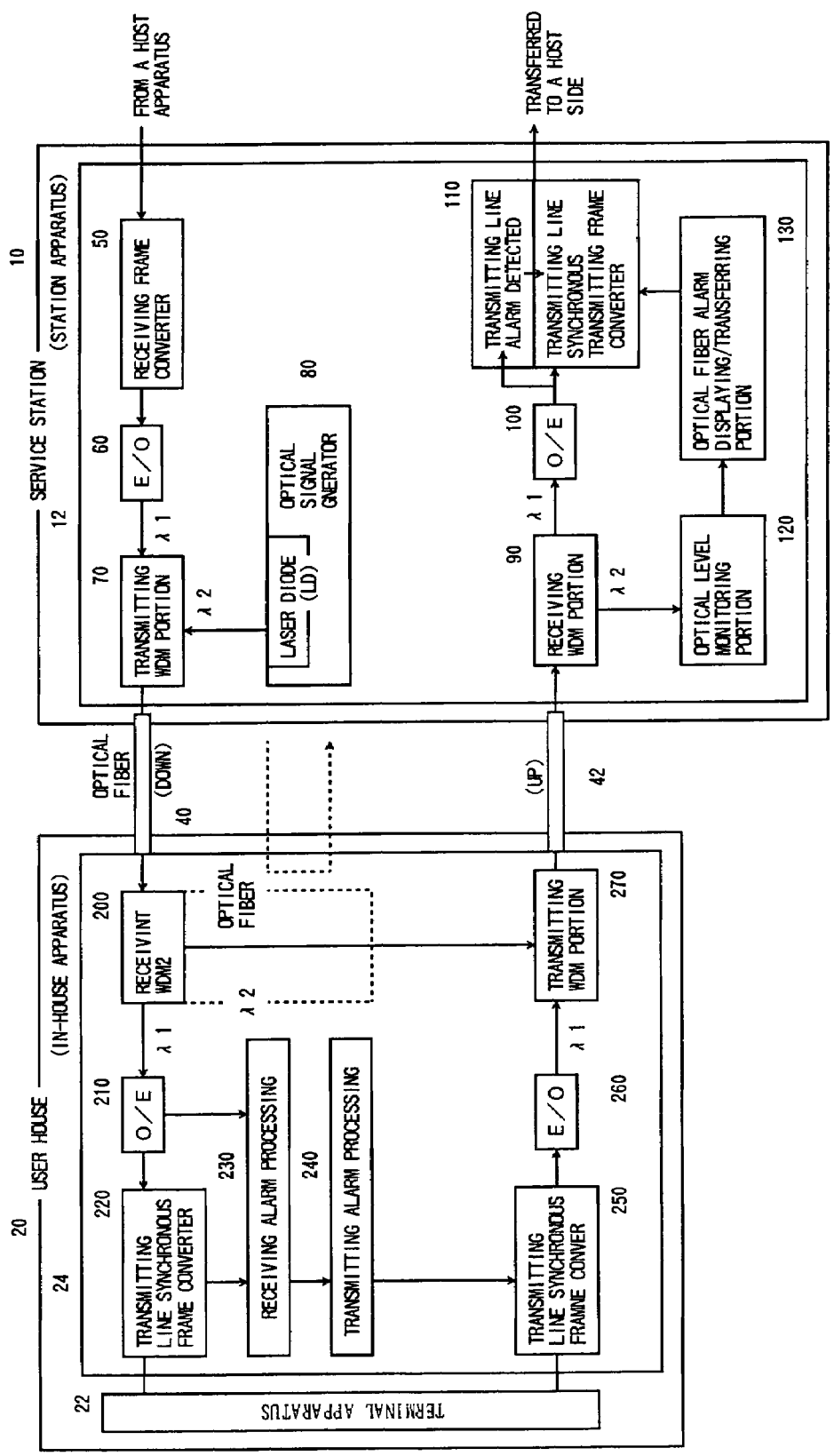
FIG. 2 is a block diagram for illustrating a transmission line monitoring apparatus of a first embodiment according to the present invention.

FIG. 2 is a block diagram for illustrating a transmission line monitoring apparatus of a first embodiment according to the present invention.

In this diagram, a receiving frame converter 50 of a station apparatus 12 in a service station 10 receives a data signal from a host apparatus (not shown). The receiving frame converter 50 converts a frame of the received data signal and transmits a converted signal to an electric/optical converter 60.

The electric/optical converter 60 converts the data signal into an optical signal with a wavelength of $\lambda 1$ and transmits the optical signal to a transmitting WDM (wavelength division multiplex) portion 70. On the other hand, an optical signal (optical level) generator 80 of the station apparatus 12 generates an optical signal with a wavelength of $\lambda 2$ as an examination signal and then transmits the optical examination signal to the transmitting WDM portion 70.

The transmitting WDM portion 70 multiplexes the two optical signals to produce a multiplexed optical signal with a wavelength of $(\lambda 1+\lambda 2)$. Thereafter, the transmitting WDM portion 70 transmits the multiplexed optical signal to a receiving WDM2 portion 200 of an in-house apparatus 24 via an optical fiber transmitting down line 40.

The receiving WDM2 portion 200 divides the multiplexed optical signal into a data signal with the wavelength of $\lambda 1$ and an examination signal with the wavelength of $\lambda 2$. Thereafter, the receiving WDM2 portion 200 transmits the data signal with the wavelength of $\lambda 1$ to an optical/electric converter 210 and the examination signal with the wavelength of $\lambda 2$ to a transmitting WDM portion 270.

The transmitting WDM portion 270 receives a data signal with the wavelength of $\lambda 1$ from an electric/optical converter 260, and the examination signal with the wavelength of $\lambda 2$ and multiplexes the two received optical signals to produce an optical signal with the wavelength of $(\lambda 1+\lambda 2)$. After that, the transmitting WDM portion 270 transmits the multiplexed optical signal to a receiving WDM portion 90 of the station apparatus 12 via an optical fiber transmitting up line 42.

In addition, the examination signal with the wavelength of $\lambda 2$ is formed to be a return signal by means of the receiving WDM2 portion 200 and the transmitting WDM portion 270 which portions are passive elements, and therefore the examination signal can return regardless of a state of a power supply of the in-house apparatus 24.

On the other hand, the data signal with the wavelength of $\lambda 1$ is transmitted to and converted by the optical/electric converter 210 of the in-house apparatus 24, and thereafter is transmitted to a transmission line synchronous frame converter 220. The transmission line synchronous frame converter 220 further transmits the data signal to a terminal 22 and, at the same time, to a transmission line synchronous frame converter 250 via a receiving alarm processor 230 and a transmitting alarm processor 240.

The transmission line synchronous frame converter 250 inserts the data signal transmitted from the receiving alarm processor 230 and transmitting alarm processor 240 into a data signal transmitted by the terminal 22, and then transmits the resulting data signal to the electric/optical converter 260.

The receiving WDM portion 90 of the station apparatus 12 divides the multiplexed optical signal into a data signal with the wavelength of $\lambda 1$ and an examination signal with the wavelength of $\lambda 2$. Thereafter, the receiving WDM portion 90 transmits the data signal with the wavelength of $\lambda 1$ to an optical/electric converter 100 and the examination signal with the wavelength of $\lambda 2$ to an optical level monitoring portion 120.

The optical level monitoring portion 120 monitors an optical signal level of the examination signal with the wavelength of $\lambda 2$. If the optical signal level is lower than a given level, the optical level monitoring portion 120 supplies an optical fiber alarm information display/transferring portion 130 with alarm information indicating that a transmission line through which the examination signal has passed is abnormal. The optical fiber alarm information display/transferring portion 130 displays the alarm information and transmits the alarm information to a transmission line synchronous transmitting frame converter 110.

The transmission line synchronous transmitting frame converter 110 inserts the alarm information transmitted from the optical fiber alarm information display/transferring portion 130 into the data signal transmitted from the optical/electric converter 100, and transmits the resulting data signal to a host side of the service station 10. Thus, the alarm information showing an abnormality in the transmission line is transmitted to the host side by being inserted into the data signal.

Figure 3:
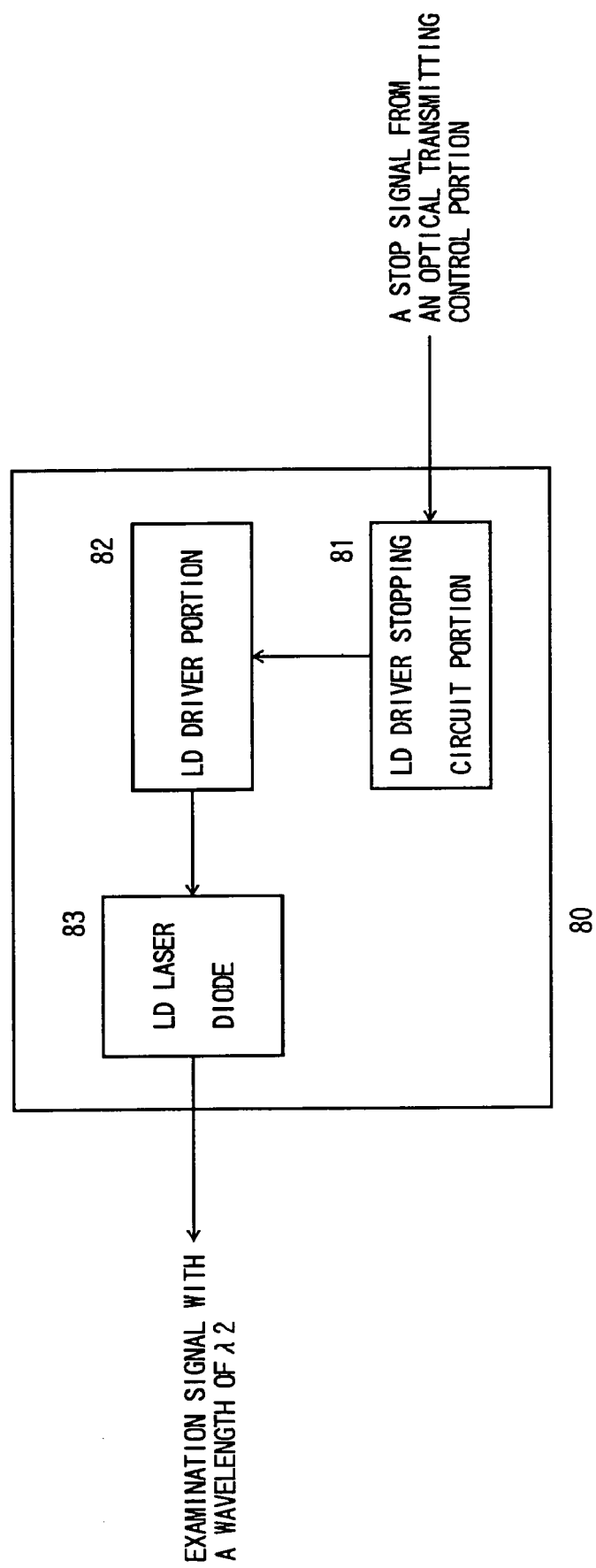
FIG. 3 is a block diagram for illustrating an optical signal (optical level) generator of the first embodiment according to the present invention.

FIG. 3 is a block diagram for illustrating the optical signal (optical level) generator 80. The optical signal generator 80 includes a LD (laser diode) driver stopping circuit portion 81, a LD driver portion 82 and a LD 83. The LD driver portion 82 determines an optical signal output level and supplies the LD 83 with a signal corresponding to the optical signal output level. The LD 83 performs an electrical-to-optical conversion of the supplied signal into an examination data signal with the wavelength of λ2 and outputs the examination data signal. In addition, when supplied with a stop signal to be described later, the LD driver stopping circuit portion 81 stops the LD driver portion 82 from operating.

Figure 4:
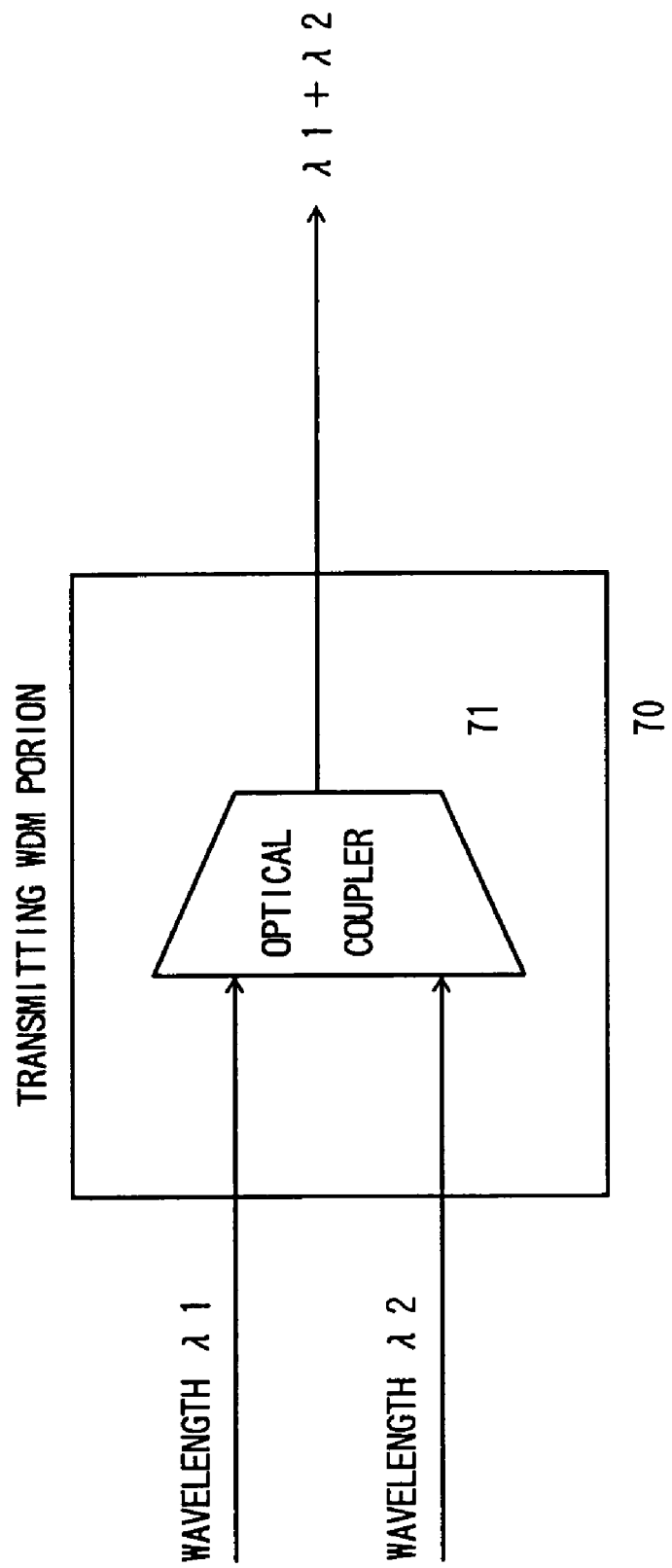
FIG. 4 is a block diagram for illustrating a transmitting WDM portion of the first embodiment according to the present invention.

FIG. 4 is a block diagram for illustrating the transmitting WDM portion 70. The transmitting WDM portion 70 includes an optical coupler 71. The optical coupler 71 is supplied with a signal with the wavelength of λ1 and a signal with the wavelength of λ2, and divides and multiplexes the two signals so as to output a signal with the wavelength of (λ1+λ2). In addition, the transmitting WDM portion 70 is formed of passive elements.

Figure 5:
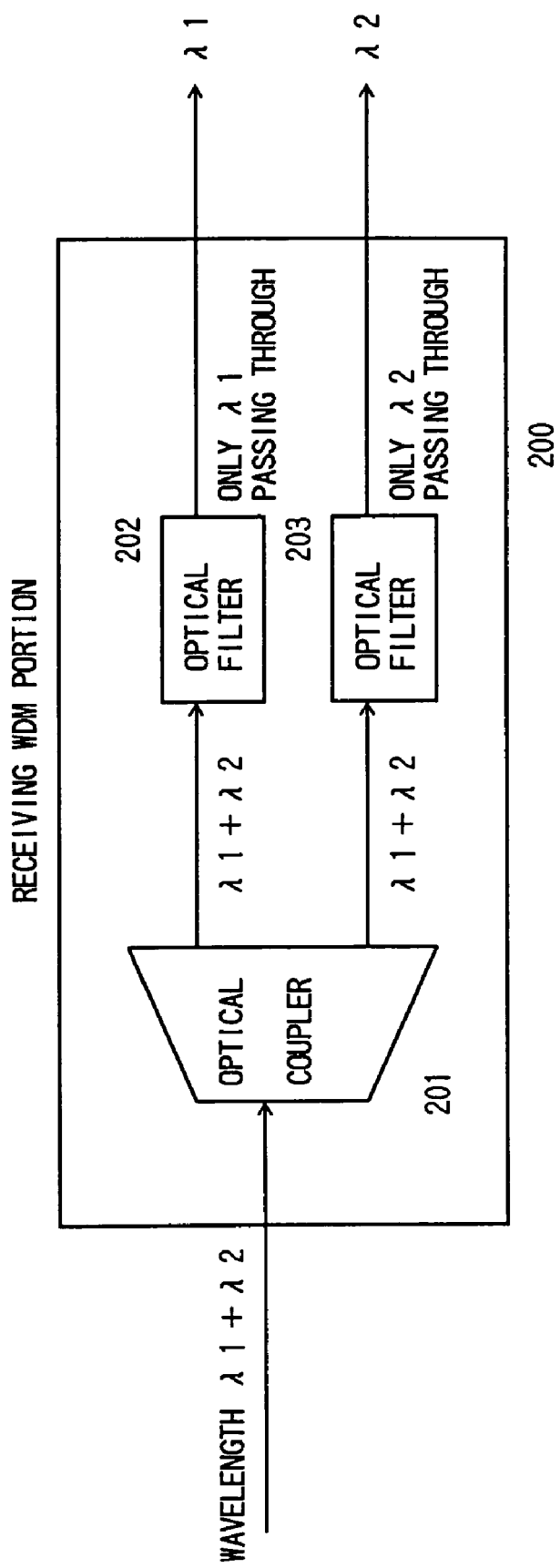
FIG. 5 is a block diagram for illustrating a receiving WDM portion of the first embodiment according to the present invention.

FIG. 5 is a block diagram for illustrating the receiving WDM2 portion 200. The receiving WDM2 portion 200 includes an optical separator 201 and optical filters 202, 203. The optical separator 201 is supplied with a signal with the wavelength of (λ1+λ2) which signal is obtained by dividing-and-multiplexing a signal with the wavelength of λ1 and a signal with the wavelength of λ2, and functions to separate the divided-and-multiplexed signal with the wavelength of (λ1+λ2) into two parts.

The optical separator 201 supplies one part of the divided-and-multiplexed signal with the wavelength of (λ1+λ2) to the optical filter 202 and the other part to the optical filter 203. The optical filter 202 only passes through the optical signal with the wavelength of λ1 and therefore only outputs the optical signal with the wavelength of λ1 from the supplied divided-and-multiplexed signal with the wavelength of (λ1+λ2). The optical filter 203 only pass through the optical signal with the wavelength of λ2 and therefore only outputs the optical signal with the wavelength of λ2 from the supplied divided-and-multiplexed signal with the wavelength of (λ1+λ2).

Figure 6:
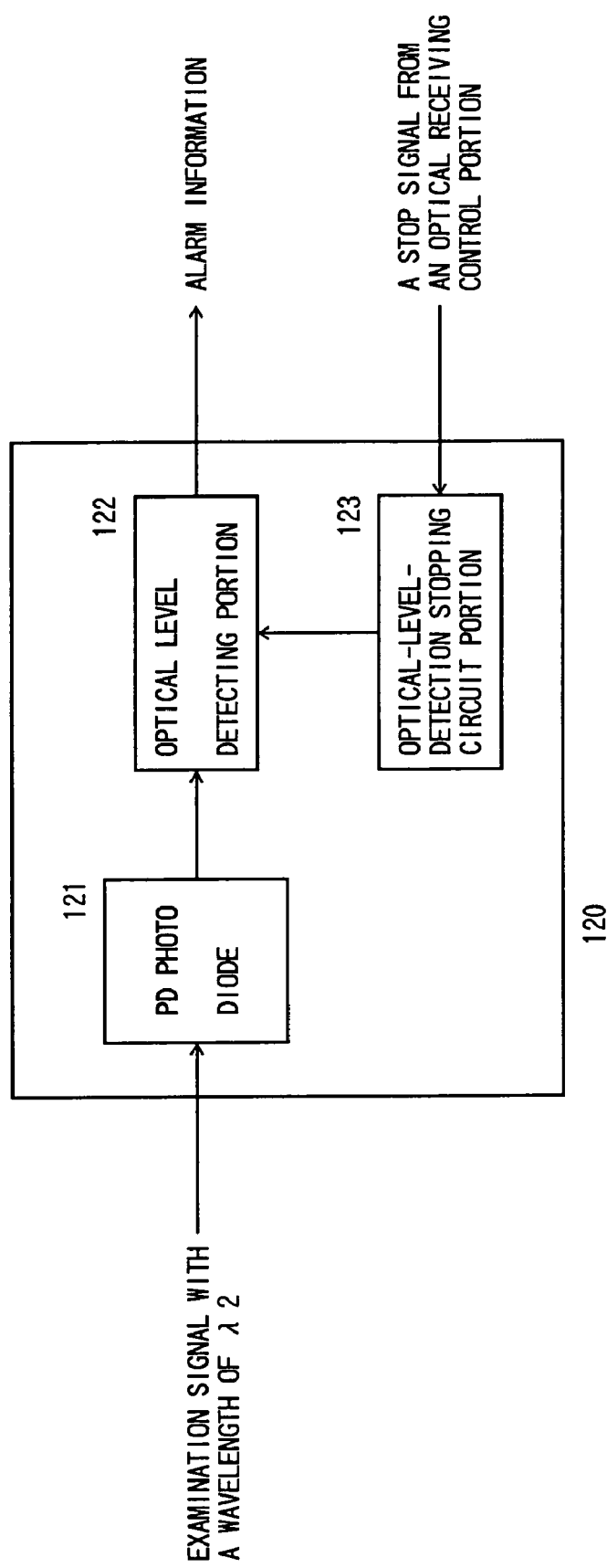
FIG. 6 is a block diagram for illustrating an optical signal (optical level) receiving portion of the first embodiment according to the present invention.

FIG. 6 is a block diagram for illustrating the optical level monitoring portion 120. The optical level monitoring portion 120 includes a PD (photo-diode) 121, an optical level detecting portion 122, and an optical-level-detection stopping circuit portion 123.

The PD 121 is supplied with an examination signal with the wavelength of λ2 and sends to the optical level detecting portion 122 a signal corresponding to an optical signal level of the examination signal with the wavelength of λ2. The optical level detecting portion 122 detects the optical signal level of the examination signal based on the signal sent from the PD 121. If the optical signal level is lower than a given level, the optical level detecting portion 122 outputs alarm information showing an abnormality in a transmission line through which the examination signal has passed. In addition, if supplied with a stop signal to be described later, the optical-level-detection stopping portion 123 stops the optical level detecting portion 122 from operating.

Figure 7:
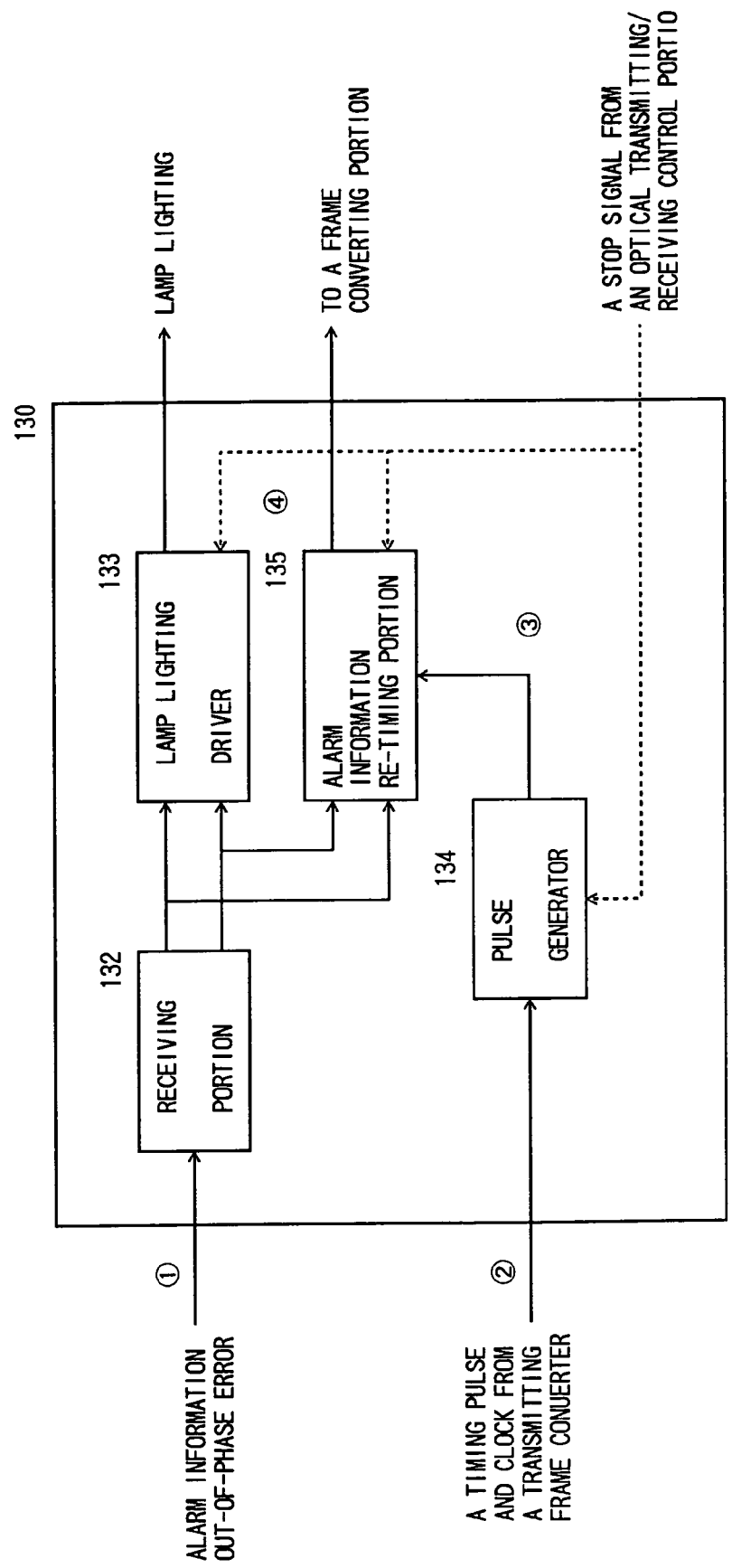
FIG. 7 is a block diagram for illustrating an optical fiber alarm displaying/transmitting portion of the first embodiment according to the present invention.

FIG. 7 is a block diagram for illustrating the optical fiber alarm information display/transferring portion 130, which portion 130 includes a receiving portion 132, a lamp lighting driver 133, a pulse generator 134, and an alarm information re-timing portion 135.

Figure 8:
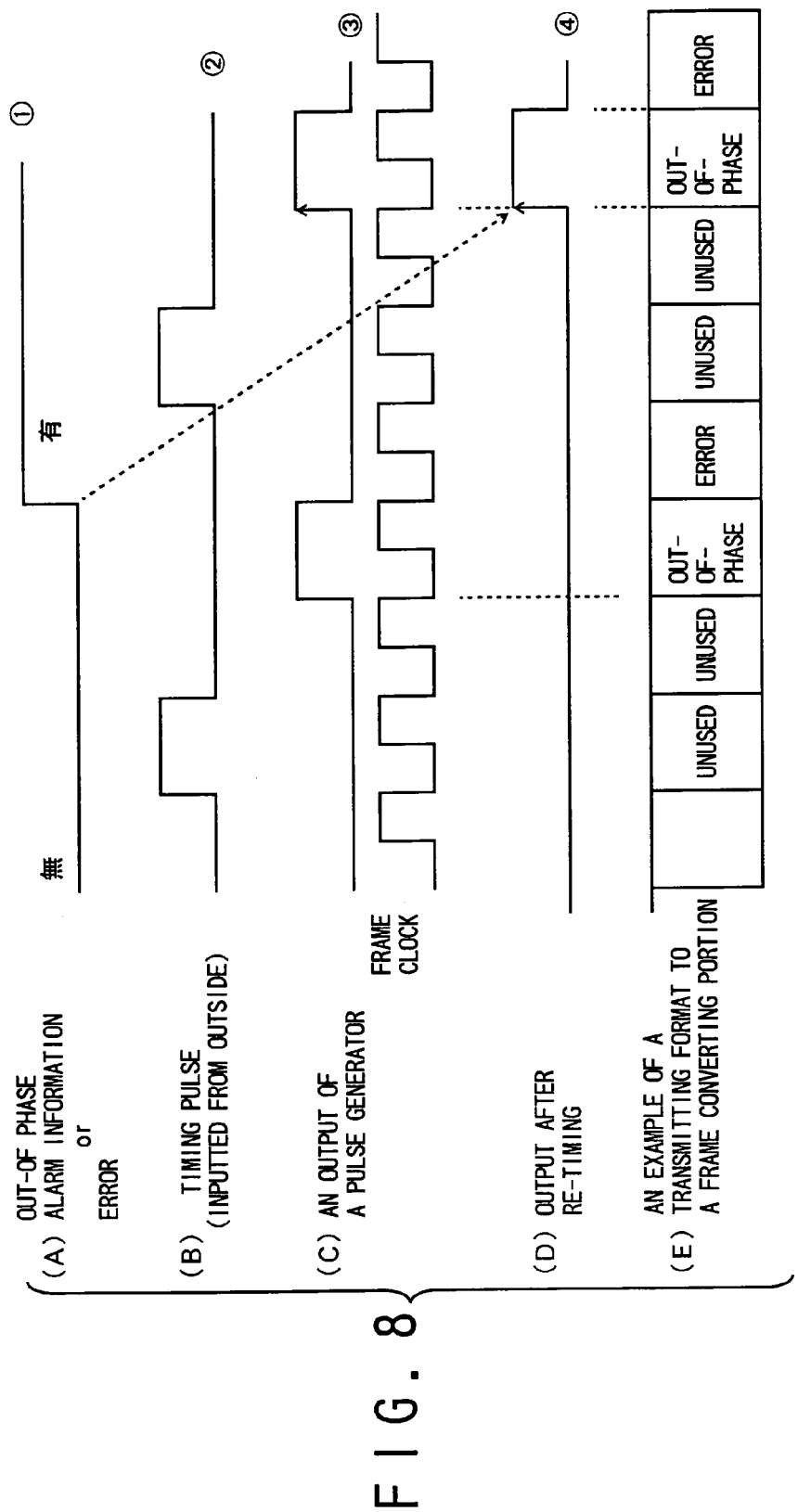
FIG. 8 is a view showing timing of input and output signals of the optical fiber alarm displaying/transmitting portion of the first embodiment according to the present invention.

When supplied with a timing pulse signal from the transmission line synchronous transmitting frame converter 110 as shown by (B) of FIG. 8, the pulse generator 134 transmits a clock signal and a frame signal to the alarm information re-timing portion 135 as shown by (C) of FIG. 8. When supplied with alarm information indicating a transmission line abnormality as shown by (A) of FIG. 8, the receiving portion 132 sends the alarm information to the lamp-lighting driver 133 and the alarm information re-timing portion 135.

When supplied with alarm information, according to timing of the clock signal and the frame signal, the alarm information re-timing portion 135 sends the alarm information to the transmission line synchronous transmitting frame converter 110 as shown by (E) of FIG. 8.

When supplied with alarm information indicating a transmission line abnormality, the lamp lighting driver 133 displays the alarm information. The alarm information may be displayed by various methods, such as lighting a lamp, LED or the like. In addition, when supplied with a stop signal from an optical transmitting/receiving control portion to be described later, the pulse generator 134 and the lamp lighting driver 133 stop. Further, the alarm information includes synchronous errors and data signal errors.

As mentioned above, the transmission line monitoring apparatus of the first embodiment can distinctively determine whether a fault has occurred in the in-house apparatus 24 or in the optical fiber transmission lines 40, 42 without the need to go to check the power state of the in-house apparatus 24.

Figure 1:
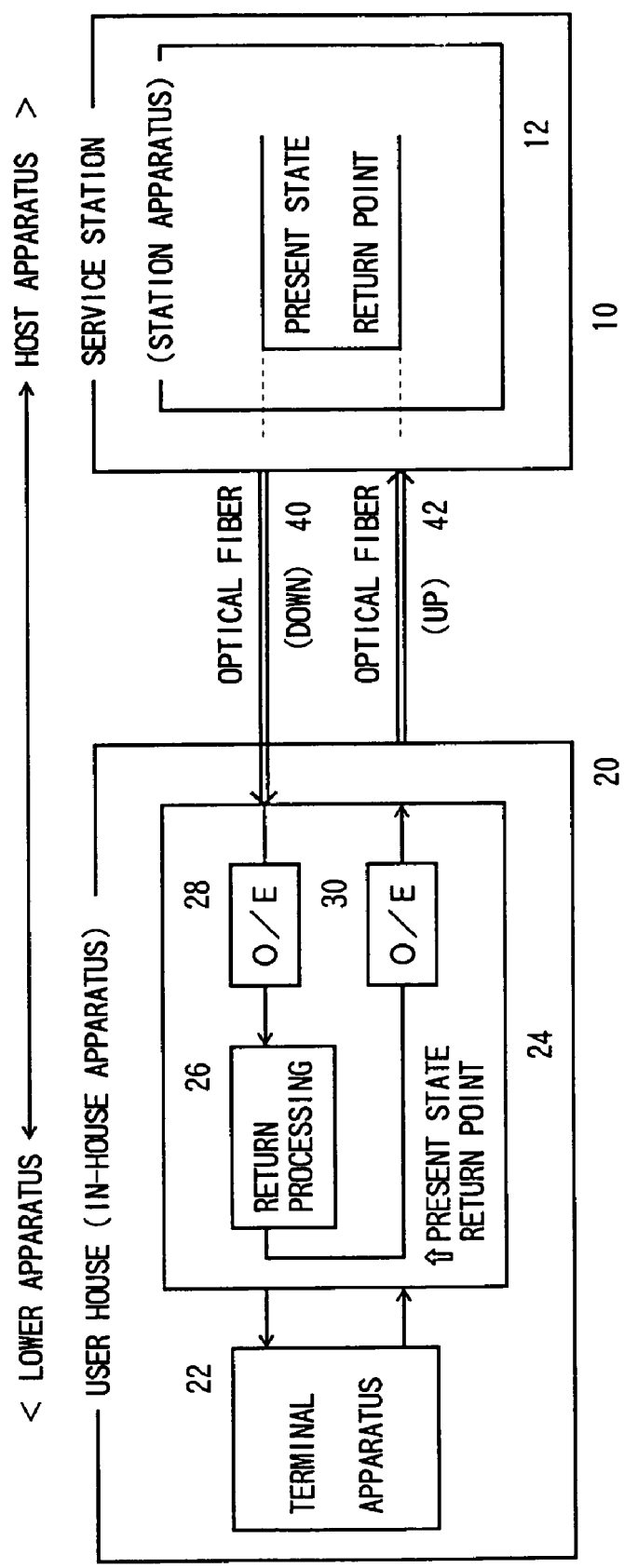
FIG. 1 is a block schematic diagram for illustrating a conventional transmission line monitoring apparatus.
Figure 9:
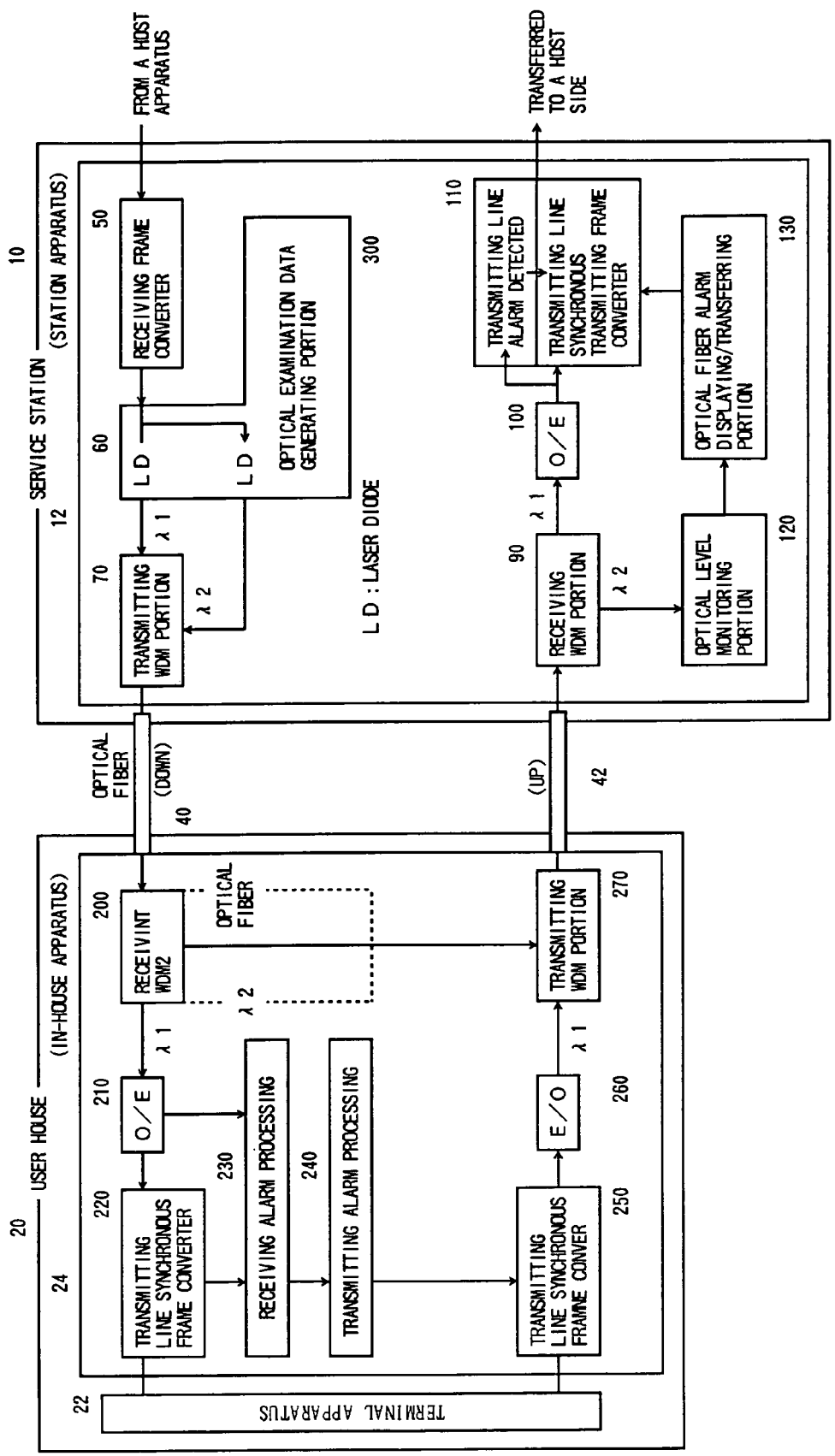
FIG. 9 is a block diagram for illustrating a transmission line monitoring apparatus of a second embodiment according to the present invention.

Next, a second embodiment of the present invention will be described with reference to FIG. 9. FIG. 9 illustrates a transmission line monitoring apparatus. The transmission line monitoring apparatus of FIG. 9 comprises an optical examination data generating portion 300 instead of the optical signal generator 80 of FIG. 1. Accordingly, the transmission line monitoring apparatus of FIG. 9 is basically the same as that of FIG. 1, and the same portions are given the same reference numerals and a description thereof is omitted.

The optical examination data generating portion 300 converts a data signal from the receiving frame converter 50 into an optical signal with the wavelength of λ1 and an optical signal with the wavelength of λ2 and supplies the two optical signals to the transmitting WDM portion 70.

Figure 10:
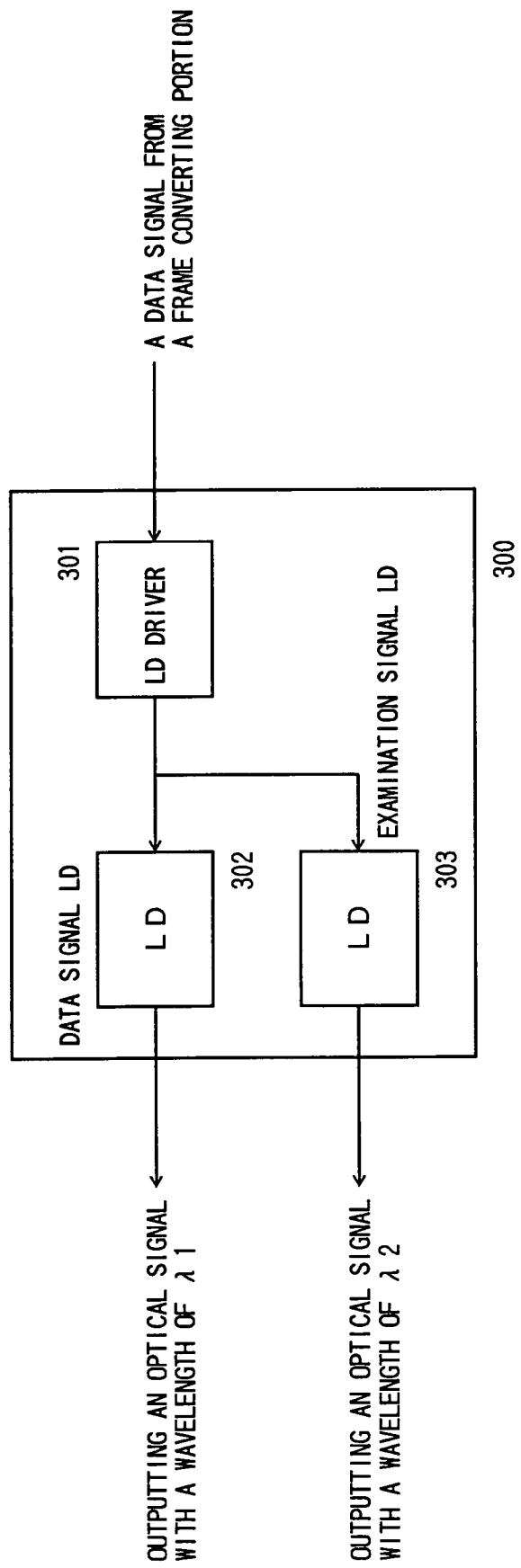
FIG. 10 is a block diagram for illustrating an optical examination data generating portion of the second embodiment according to the present invention.

Hereinafter, a detailed description of the optical examination data generating portion 300 will be given with reference to FIG. 10. FIG. 10 is a block diagram for illustrating the optical examination data generating portion 300 which includes a LD driver 301, a data signal LD 302, and an examination signal LD 303.

The LD driver 301 receives and transmits a data signal to the data signal LD 302 and the examination signal LD 303. The data signal LD 302 performs an electric/optical conversion of the received data signal into a data signal with the wavelength of λ1 and outputs the converted data signal with the wavelength of λ1. The examination signal LD 303 performs an electric/optical conversion of the received data signal into a data signal with the wavelength of λ2 and outputs the converted data signal with the wavelength of λ2.

As mentioned above, the transmission line monitoring apparatus of the second embodiment uses a data signal to generate an examination signal, and thereby an individual circuit for generating the examination signal is not needed. Hence, circuits in the transmission line monitoring apparatus can be simplified.

Figure 11:
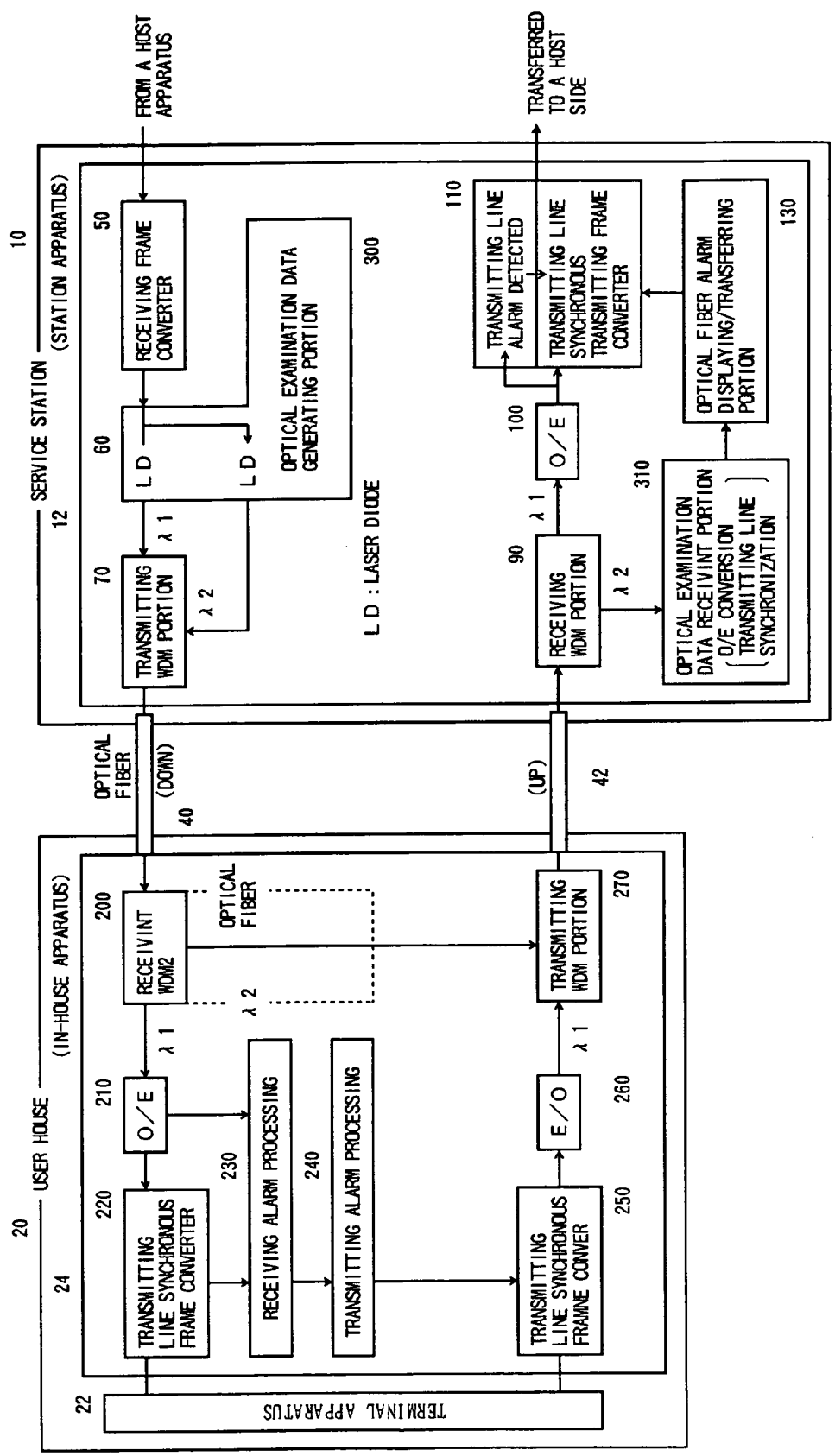
FIG. 11 is a block diagram for illustrating a transmission line monitoring apparatus of a third embodiment according to the present invention.

Next, a third embodiment of the present invention will be described with reference to FIG. 11. A transmission line monitoring apparatus shown in FIG. 11 has an optical examination data receiving portion 310 instead of the optical level monitoring portion 120 shown in FIG. 9. Accordingly, the transmission line monitoring apparatus of FIG. 11 is similar to that of FIG. 9, and the same portions are given the same reference numerals and a description thereof is omitted.

The optical examination data receiving portion 310 receives an examination signal with the wavelength of λ2 from the receiving WDM portion 90 and performs an optical/electric conversion of the optical signal into an original data signal so as to detect a synchronous error and a data signal error by using the data signal. For example, the synchronous error shows a transmission line abnormality and the data error shows a transmission line state. It should be noted that a data signal supplied from the receiving frame converter 50 is used as an examination signal. The optical examination data receiving portion 310 sends the detected synchronous error and data signal error to the optical fiber alarm information display/transferring portion 130.

Figure 12:
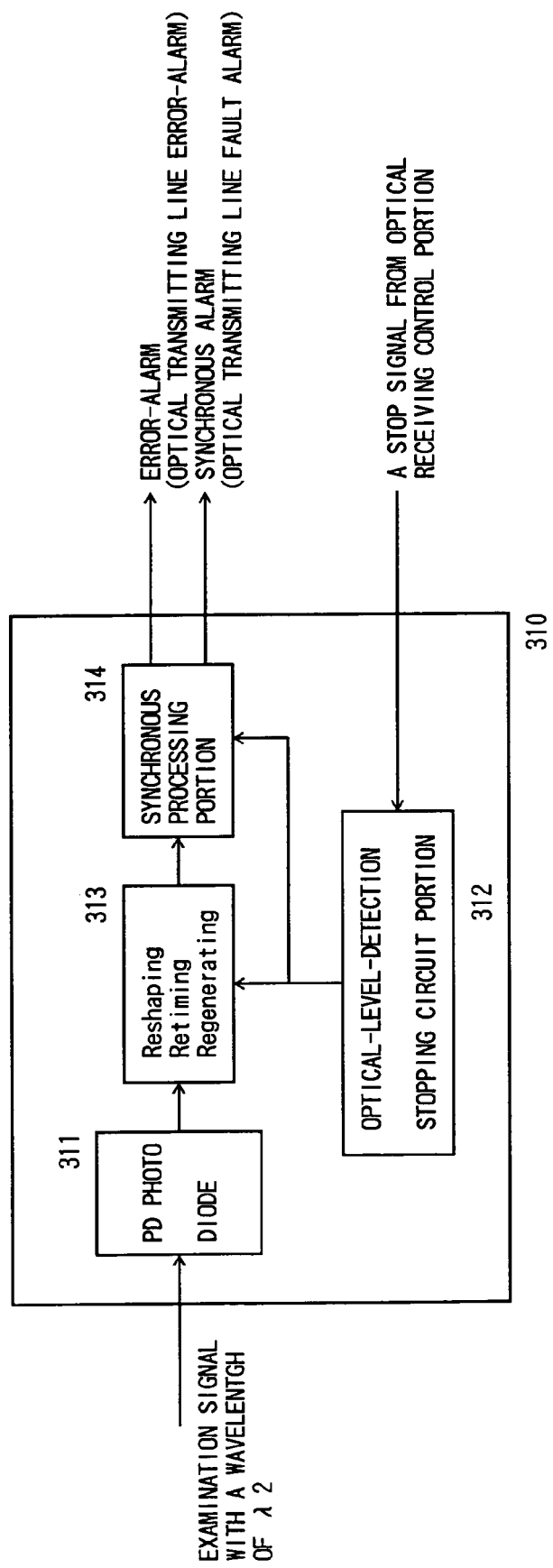
FIG. 12 is a block diagram for illustrating an optical examination data receiving portion.

A detailed description of the optical examination data receiving portion 310 will be given with reference to FIG. 12. FIG. 12 shows the optical examination data receiving portion 310 including a PD 311, an optical-level-detection stopping circuit portion 312, an electrical signal regulating portion 313 and a synchronous processing portion 314.

The PD 311 receives an examination signal with the wavelength of λ2 and performs an optical/electric conversion of the examination signal into an original data signal. The original data signal is transmitted to the electrical signal regulating portion 313, in which reshaping, re-timing and regenerating are performed for the original data signal. Thereafter, the processed data signal is transmitted from the electrical signal regulating portion 313 to the synchronous processing portion 314 in which a synchronous processing is carried out for the data signal.

Figure 13:
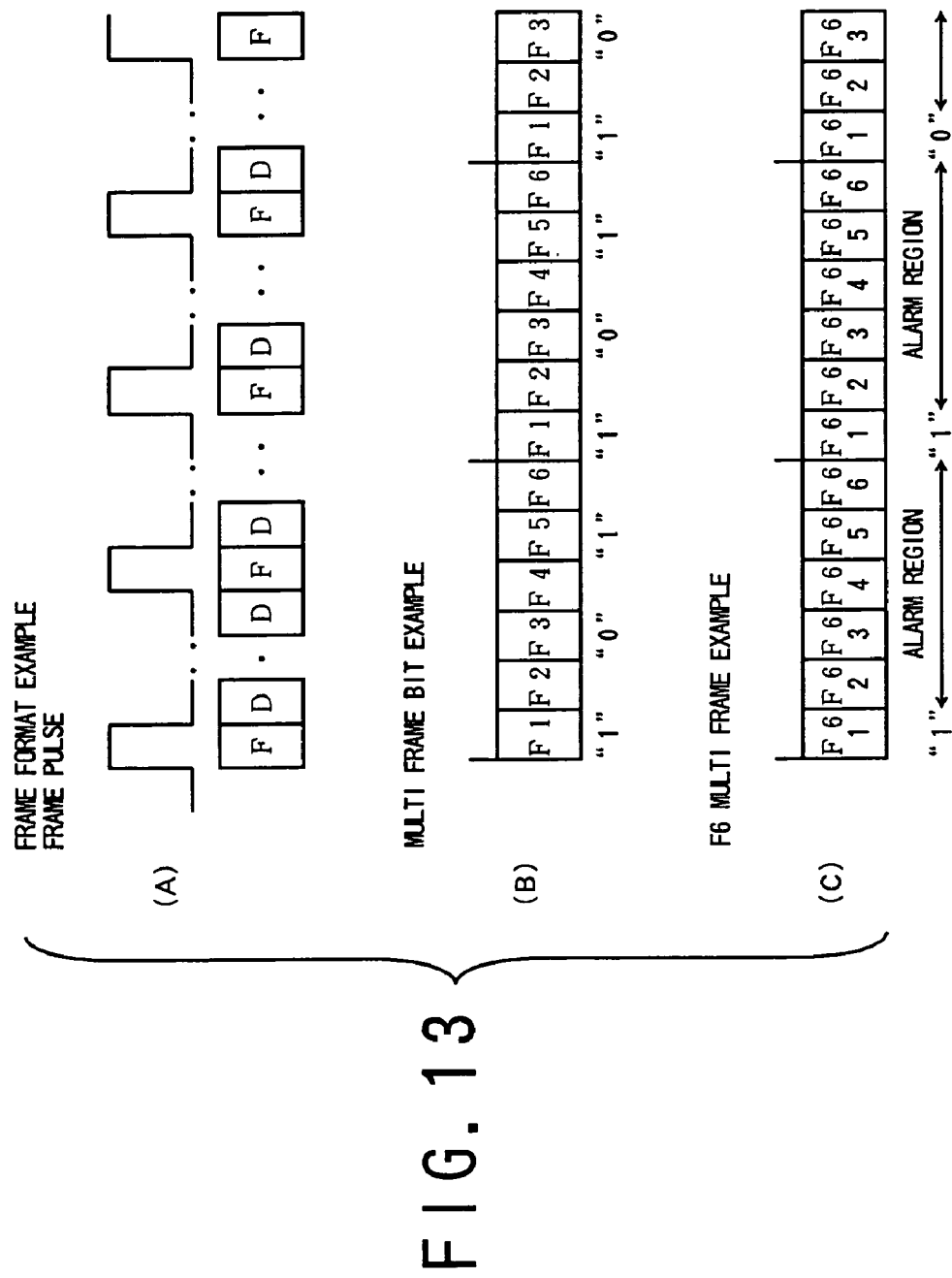
FIG. 13 is a view showing an example of a synchronous processing of the third embodiment according to the present invention.

The synchronous processing will be described with reference to FIG. 13. FIG. 13 illustrates an example of the synchronous processing. As shown by (A) of FIG. 13, the synchronous processing of a data signal includes detection of a synchronous error by detecting frame synchronous bits which are included in the data signal. A reference character "F" denotes the frame synchronous bits and "D" denotes data regions.

In (B) of FIG. 13, an example of a bit-string of the frame synchronous bits is illustrated. Herein, F1, F3 and F5 are used as synchronous bits, F2 and F4 are used as CRC error detecting bits, and F6 is used as an alarm information bit. The synchronous error is detected by the synchronous bits at the same time the data signal error is detected by the CRC error detecting bits. Thus, the detected synchronous error and data signal error are stored in F6.

In (C) of FIG. 13, an example of a bit-string of the alarm information bits of F6 is illustrated. Herein, a first bit of F6 (hereinafter referred to as F6-1, and the same applying to other bit-strings) is used as a synchronous bit of the alarm information bit, and F6-2 to F6-6 are used as the alarm information. For example, F6-2 is used as a bit indicating a synchronous error and F6-3 as a bit indicating a data signal error. In addition, other kinds of alarm information can be transferred as mentioned above.

Returning to FIG. 12, the synchronous processing portion 314 outputs the above-mentioned alarm information to the optical fiber alarm information display/transferring portion 130. In addition, in a case in which a stop signal from a later-described optical receiving control portion 330 is transmitted to the optical-level-detection stopping circuit portion 312, the processing of the electrical signal regulating portion 313 and the synchronous processing portion 314 stop.

As mentioned above, the transmission line monitoring apparatus of the third embodiment of the present invention can detect a synchronous error and a data signal error in the optical examination data receiving portion 310 by generating an examination signal from a data signal. Hence, a transmission line abnormality can be monitored by a synchronous error, and a transmission line state such as an inferior state, or the like can be monitored by a data signal error.

Figure 14:
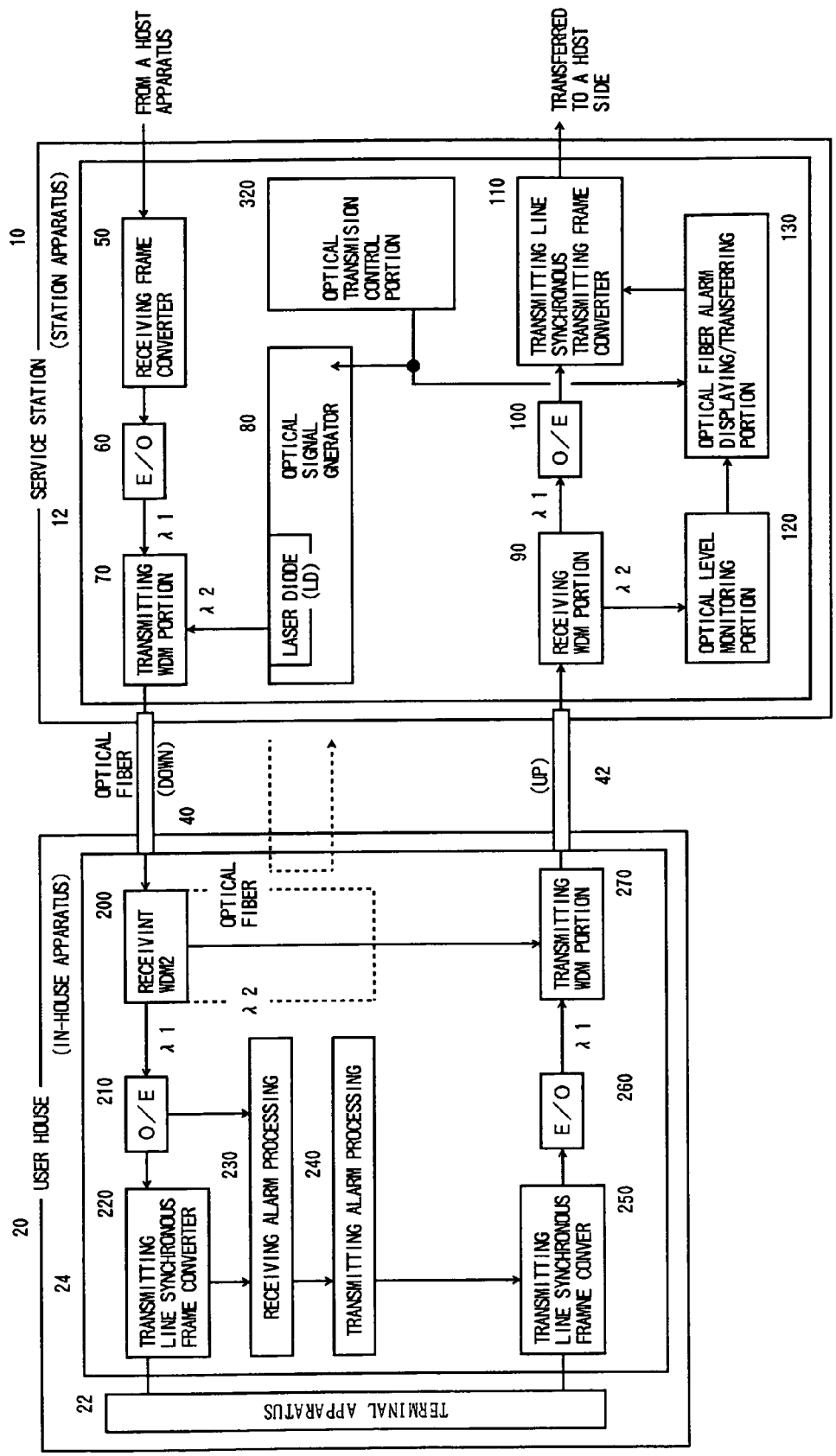
FIG. 14 is a block diagram for illustrating a transmission line monitoring apparatus of a fourth embodiment according to the present invention.

Next, a fourth embodiment of the present invention will be described with reference to FIG. 14. A transmission line monitoring apparatus shown in FIG. 14 is basically the same as that of FIG. 2 except for further having an optical transmission control portion 320. Accordingly, the same portions are given the same reference numerals and a description thereof is omitted.

For example, in a case in which the in-house apparatus 24 of the user house 20 does not support a transmission line monitoring method of the present invention, generating an examination signal becomes useless. For this reason, the optical transmission control portion 320 sends a stop signal to the optical signal generator 80 in a case where a transmission line monitoring apparatus of the present invention is not needed.

Figure 15:
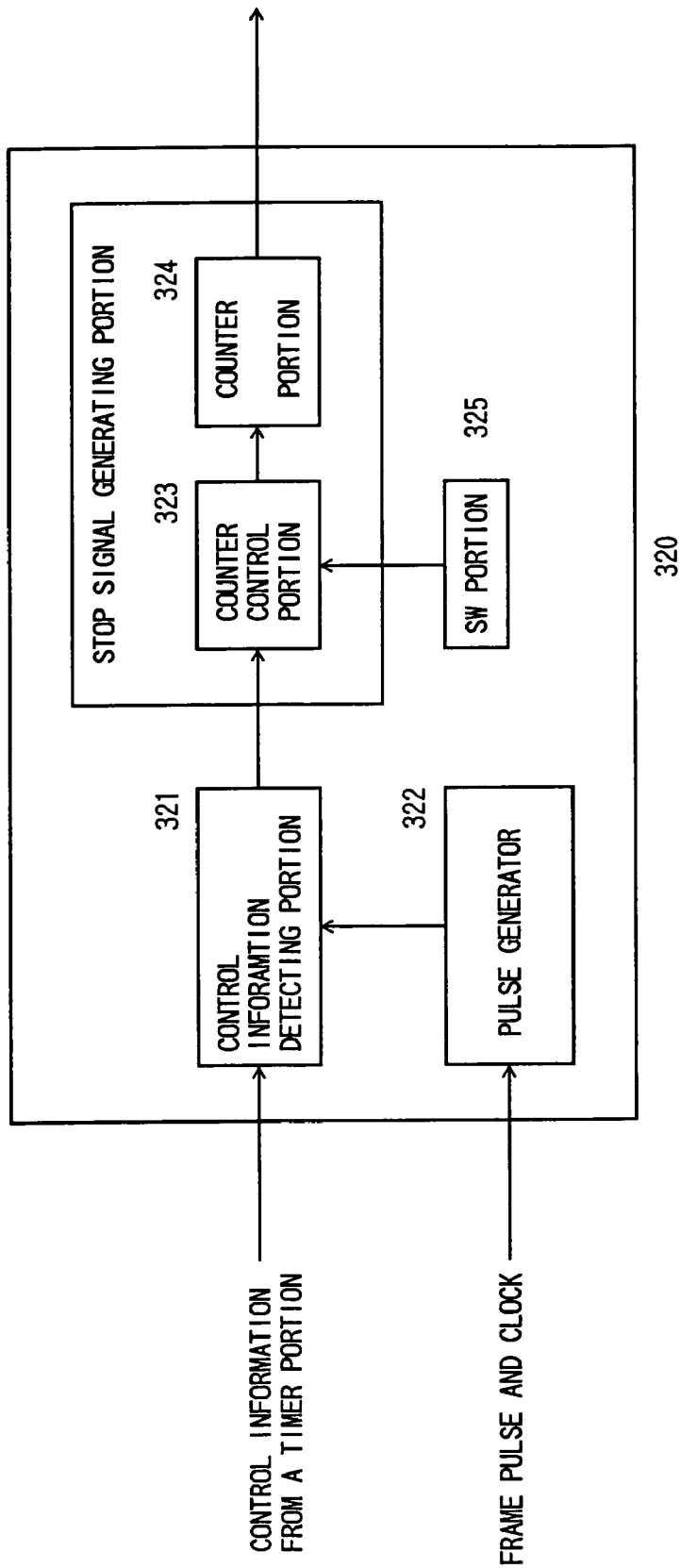
FIG. 15 is a block diagram for illustrating an optical transmission control portion of the fourth embodiment according to the present invention.

A detailed description of the optical transmission control portion 320 will be given with reference to FIG. 15. The optical transmission control portion 320 shown in FIG. 15 includes a control information detecting portion 321, a pulse generator 322, a counter control portion 323, a counter portion 324 and a SW portion 325.

The control information detecting portion 321 detects and transmits a control signal from a later-described timer to the counter control portion 323. The pulse generator 322, based on a clock signal and a frame phase pulse signal, generates a timing signal for detecting the control signal in the control information detecting portion 321.

The SW portion 325 sets a time for stopping generation of an examination signal according to a manual setting, and then, based on the set time, sends a control signal to the counter control portion 323. In addition, the SW portion 325 may be set up for stopping generation of an examination signal regardless of the set time.

The counter control portion 323 controls the counter portion 324 based on control signals from the control information detecting portion 321 and the SW portion 325. The counter portion 324 is controlled by the counter control portion 323 so as to send the optical signal generator 80 a stop signal indicating a stop of the examination signal.

As mentioned above, the transmission line monitoring apparatus of the fourth embodiment of the present invention can save power by stopping generation of an examination signal when the transmission line monitoring apparatus is not needed.

Figure 16:
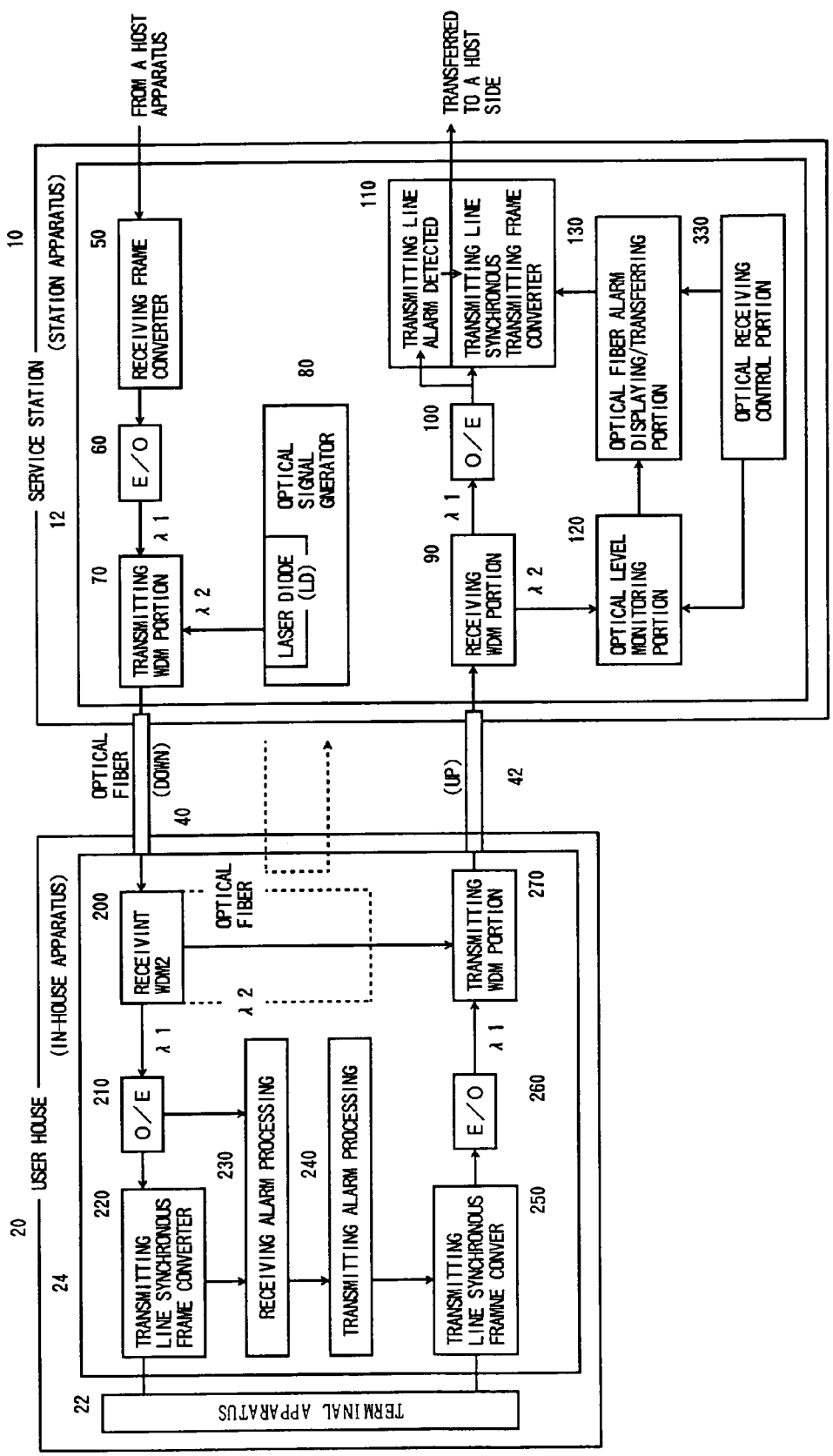
FIG. 16 is a block diagram for illustrating a transmission line monitoring apparatus of a fifth embodiment according to the present invention.

Next, a fifth embodiment of the present invention will be described with reference to FIG. 16. A transmission line monitoring apparatus shown in FIG. 16 is basically the same as that of FIG. 2 except for further having an optical receiving control portion 330. Accordingly, the same portions are given the same reference numerals and a description thereof is omitted.

For example, in a case where the in-house apparatus 24 of the user house 20 does not support a transmission line monitoring method of the present invention, to generate alarm information indicating a transmission line abnormality based on an examination signal becomes useless. That is, the optical level monitoring portion 120 and the optical fiber alarm information display/transferring portion 130 are needed to be used. For this reason, when the transmission line monitoring apparatus of the present invention is not needed, the optical receiving control portion 330 sends a stop signal to the optical level monitoring portion 120 and the optical fiber alarm information display/transferring portion 130. In addition, the optical receiving control portion 330 has the same construction as the optical receiving control portion 320 of FIG. 15 and a description thereof is omitted.

As mentioned above, the transmission line monitoring apparatus of the fifth embodiment of the present invention can save power by stopping generation of alarm information when the transmission line monitoring apparatus is not needed.

Figure 17:
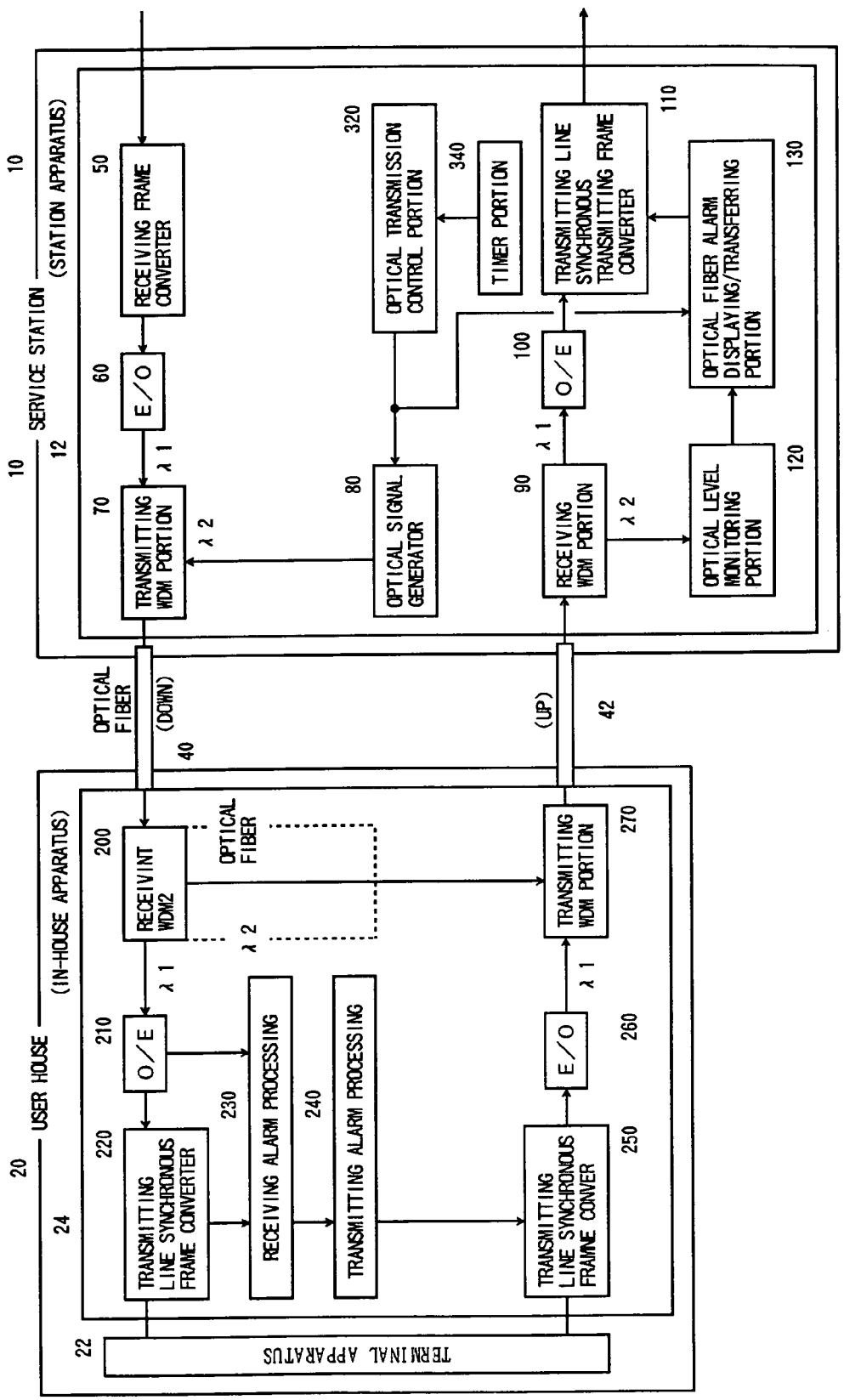
FIG. 17 is a block diagram for illustrating a transmission line monitoring apparatus of a sixth embodiment according to the present invention.

Next, a sixth embodiment of the present invention will be described with reference to FIG. 17. A transmission line monitoring apparatus of FIG. 17 is basically the same as that of FIG. 14 except for further having a timer portion 340. Accordingly, the same portions are given the same reference numerals and a description thereof is omitted.

The timer portion 340 functions to manage time and sends the optical receiving control portion 320 a control signal for controlling a start or stop of generating an examination signal. The control signal controls an interval of generating the examination signal so as to make the transmission line monitoring apparatus of the present invention operates at given intervals.

Figure 18:
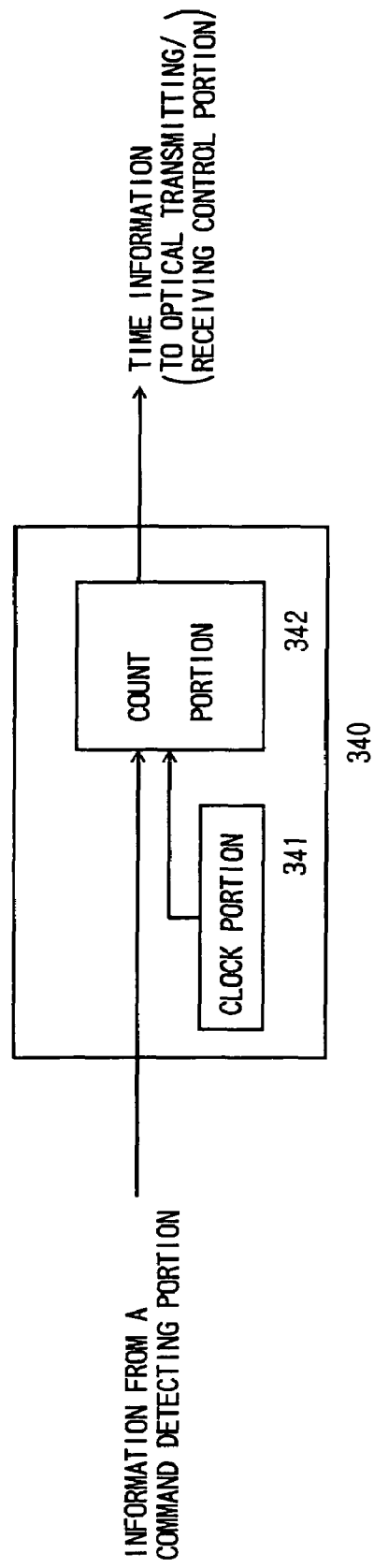
FIG. 18 is a block diagram for illustrating a timer of the sixth embodiment according to the present invention.

A detailed description of the timer portion 340 is given with reference to FIG. 18. The timer portion 340 shown in FIG. 18 includes a clock portion 341 and a counter portion 342.

The clock portion 341 generates a clock signal and sends the clock signal to the counter portion 342. Based on the clock signal, the counter portion 342 performs time management, and sends a control signal to the optical receiving control portion 320 as soon as it counts the clock signal corresponding to a given time. In addition, when supplied with a signal from a later-described command detecting portion, the counter portion 342 stops its processing.

As mentioned above, the transmission line monitoring apparatus of the sixth embodiment of the present invention can work at given intervals by using the timer portion 340 to control generation of an examination signal. Hence, the consumption of power used by the apparatus can be reduced.

Figure 19:
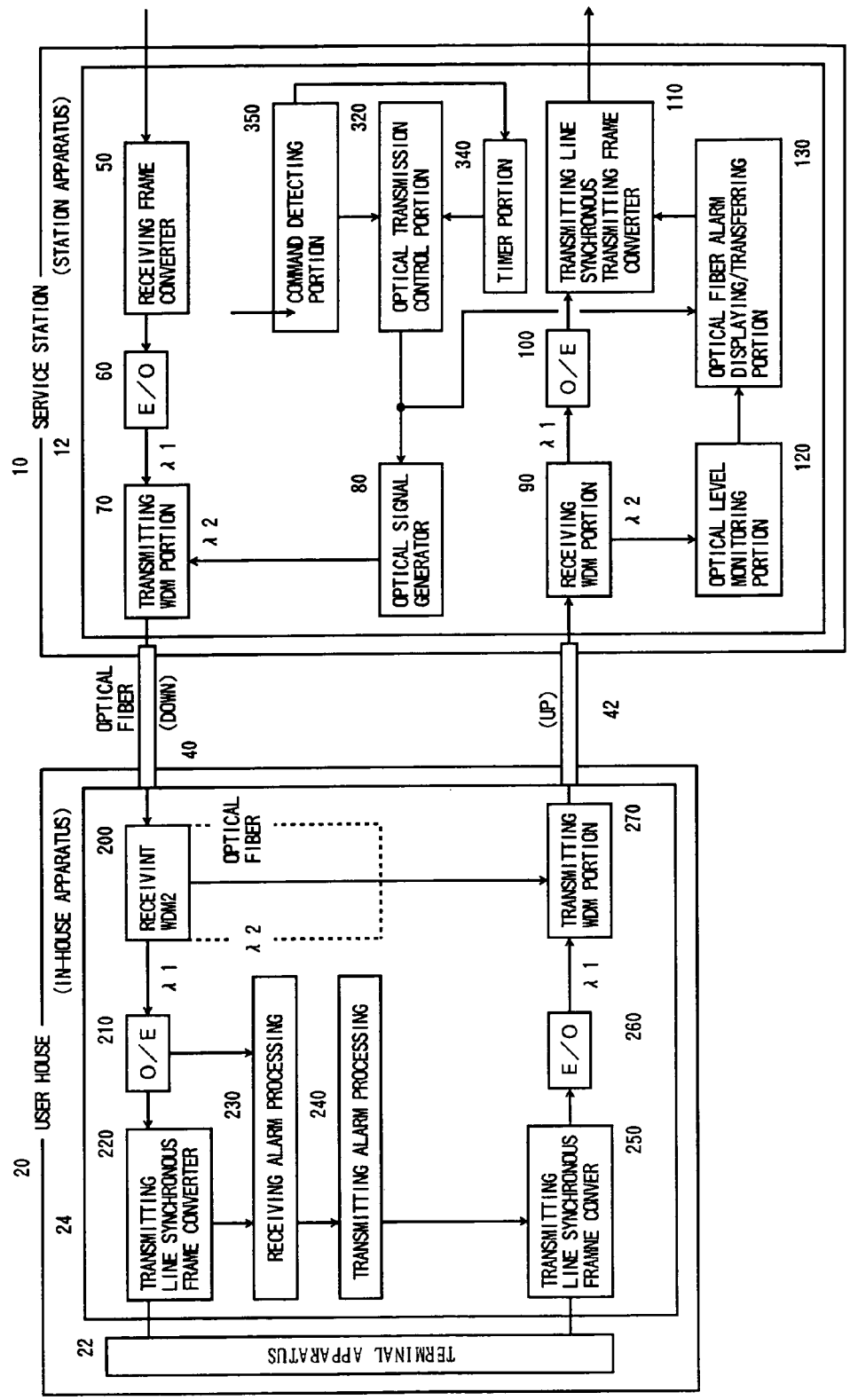
FIG. 19 is a block diagram for illustrating a transmission line monitoring apparatus of a seventh embodiment according to the present invention.

Next, a seventh embodiment of the present invention will be described with reference to FIG. 19. A transmission line monitoring apparatus shown in FIG. 19 is basically the same as that of FIG. 17 except for further having a command detecting portion 350. Accordingly, the same portions are given the same reference numerals and a description thereof is omitted.

The command detecting portion 350 detects an examination control command signal stored in a predetermined position of a data signal transmitted from a host side, and sends a signal obtained based on the command signal to the optical receiving control portion 320 and the timer portion 340. In addition, the examination control command signal is formatted as shown in FIG. 20.

The examination control command signal of FIG. 20 respectively indicates examination information in each bit thereof. For example, CO1 indicates a start/stop of a transmission line examination, and CO2 indicates a stop of the transmission line examination, or a start performed at given intervals. Hence, the transmission line monitoring apparatus can be controlled on the host side.

Figure 21:
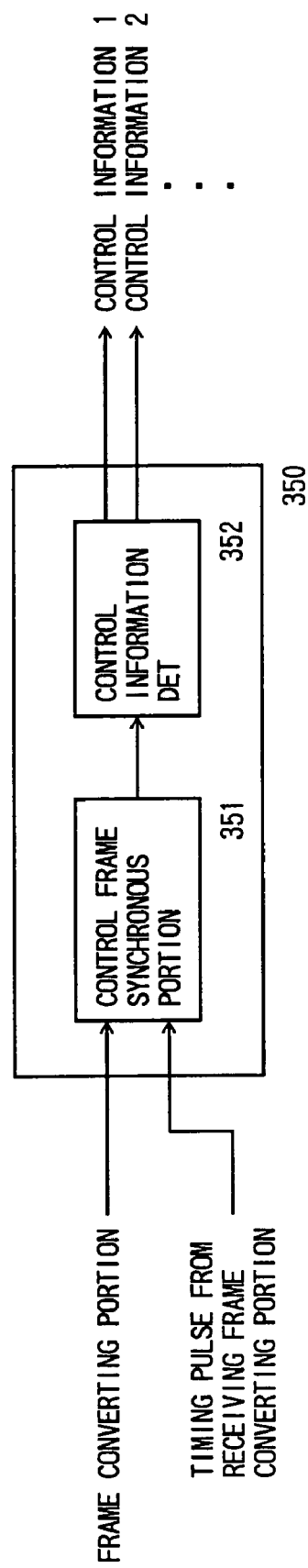
FIG. 21 is a block diagram for illustrating a command detecting portion of the seventh embodiment according to the present invention.

A detailed description of the command detecting portion 350 is given with reference to FIG. 21. The command detecting portion 350 shown in FIG. 21 includes a control frame synchronous portion 351 and a control information DET portion 352.

The control frame synchronous portion 351 synchronizes an examination control command signal with a timing pulse signal supplied from the receiving frame converter 50. Thereafter the examination control command signal is transmitted to the control information DET portion 352 in which a control signal is detected. The control information DET portion 352 sends the detected control signal to the optical transmission control portion 320 and the timer portion 340.

As mentioned above, the transmission line monitoring apparatus of the seventh embodiment of the present invention can use the command detecting portion 350 to detect a control signal from a data signal supplied by a host apparatus. Hence, control of the transmission line monitoring apparatus can be performed in a host apparatus. Furthermore, the transmission line monitoring apparatus of the present invention can save power because an examination is only performed when the host apparatus transfers alarm information indicating a transmission line abnormality.

In what is claimed, a first optical coupling unit corresponds to the transmitting WDM portion 70, a first optical dividing unit corresponds to the receiving WDM2 portion 200, a second optical coupling unit corresponds to the transmitting WDM portion 270, a second optical dividing unit corresponds to the receiving WDM portion 90, a first examination signal generator corresponds to the optical signal generator 80, an alarm information output unit corresponds to the optical level monitoring portion 120, an alarm information display/transferring unit corresponds to the optical fiber alarm information display/transferring portion 130, a second examination signal generator corresponds to the optical examination data generating portion 300, an error information output unit corresponds to the optical examination data receiving portion 310, an error information displaying/transferring unit corresponds to the optical fiber alarm information display/transferring portion 130, a first control unit corresponds to the optical transmitting control portion 320, a second control unit corresponds to the optical receiving control portion 330, a timer corresponds to the timer portion 340, and a command detecting unit corresponds to the command detecting portion 350.

The present invention is not limited to the specifically disclosed embodiments, and variations and modifications may be made without departing from the scope of the present invention.

The present application is based on Japanese priority application No. 11-042290 filed on Feb. 19, 1999, the entire contents of which are hereby incorporated by reference.

What is claimed is:

1. A transmission line monitoring apparatus monitoring faults occurring in a transmission line and/or in an apparatus which are connected with the transmission line, said transmission line monitoring apparatus comprising:
   a first optical coupling unit which couples a down data signal of a first wavelength and an examination signal of a second wavelength so as to transmit a first coupled signal to a lower apparatus;
   a first optical dividing unit to demultiplex said first coupled signal from said optical coupling unit so as to divide and split said first coupled signal into said down data signal with the first wavelength and said examination signal with the second wavelength, said examination signal being returned;
   a second optical coupling unit which couples an up data signal with the first wavelength and said returned examination signal from said first optical dividing unit so as to transmit a second coupled signal toward a host apparatus;
   a second optical dividing unit to demultiplex said second coupled signal from said second optical coupling unit so as to divide and split said second coupled signal into said up data signal with the first wavelength and said returned examination signal with the second wavelength; and
   a monitoring unit which monitors a fault and an exact location of said fault by using said examination signal with the second wavelength and indicates said exact location of whether said fault occurs in the transmission line, the lower apparatus or the host apparatus, and
   where said first optical coupling unit, said first optical dividing unit, said second optical coupling unit and said second optical dividing unit are formed of passive elements that are operable without a power supply.

2. The transmission line monitoring apparatus as claimed in claim 1, further comprising a first examination signal generator which generates said examination signal with the second wavelength.

3. The transmission line monitoring apparatus as claimed in claim 2, wherein said monitoring unit includes:
   an alarm information output unit which monitors a signal level of said examination signal with the second wavelength and, if said signal level is lower than a predetermined signal level, then outputs alarm information; and
   an alarm information displaying/transferring unit which, when said alarm information is outputted, displays said alarm information and insert said alarm information into said up data signal to be transmitted to said host apparatus.

4. The transmission line monitoring apparatus as claimed in claim 1, further comprising:
   an examination signal generator which divides an input down data signal into two signals, one signal being converted into said down data signal with the first wavelength, the other signal being converted into said examination signal with the second wavelength.

5. The transmission line monitoring apparatus as claimed in claim 1, wherein said up data signal with the first wavelength includes at least a portion of said down data signal inserted therein.

6. A transmission line monitoring apparatus monitoring faults occurring in a transmission line and in apparatus which are connected with the transmission line, said transmission line monitoring apparatus comprising:
   a first optical coupling unit which couples a down data signal of a first wavelength and an examination signal of a second wavelength so as to transmit a first coupled signal to a lower apparatus;
   a first optical dividing unit to demultiplex said first coupled signal from said optical coupling unit so as to divide and split said first coupled signal into said down data signal with the first wavelength and said examination signal with the second wavelength;
   a second optical coupling unit which couples an up data signal with the first wavelength and said examination signal from said first optical dividing unit so as to transmit a second coupled signal toward a host apparatus;
   a second optical dividing unit to demultiplex said second coupled signal from said second optical coupling unit so as to divide and split said second coupled signal into said up data signal with the first wavelength and said examination signal with the second wavelength;
   a monitoring unit which monitors a fault and a location of said fault by using said examination signal with the second wavelength;
   an examination signal generator which divides an input down data signal into two signals one signal being converted into said down data signal with the first wavelength, the other signal being converted into said examination signal with the second wavelength;
   an error information output unit which outputs synchronous error information and data signal error information based on said examination signal with the second wavelength; and
   an error information displaying/transferring unit which, when said synchronous error information and said data signal error information are outputted, displays said error information and inserts said error information into said up data signal to be transmitted to said host apparatus, and
   where said first optical coupling unit, said first optical dividing unit, said second optical coupling unit and said second optical dividing unit are formed of passive elements.

7. A transmission line monitoring apparatus monitoring faults occurring in a transmission line and in apparatus which are connected with the transmission line, said transmission line monitoring apparatus comprising:
   a first optical coupling unit which couples a down data signal of a first wavelength and an examination signal of a second wavelength so as to transmit a first coupled signal to a lower apparatus;
   a first optical dividing unit to demultiplex said first coupled signal from said optical coupling unit so as to divide and split said first coupled signal into said down data signal with the first wavelength and said examination signal with the second wavelength;
   a second optical coupling unit which couples an up data signal with the first wavelength and said examination signal from said first optical dividing unit so as to transmit a second coupled signal toward a host apparatus;
   a second optical dividing unit to demultiplex said second coupled signal from said second optical coupling unit so as to divide and split said second coupled signal into said up data signal with the first wavelength and said examination signal with the second wavelength;

a monitoring unit which monitors a fault and a location of said fault by using said examination signal with the second wavelength;

a first examination signal generator which generates said examination signal with the second wavelength; and a first control unit which controls a start and stop of said first examination signal generator, and where said first optical coupling unit, said first optical dividing unit, said second optical coupling unit and said second optical dividing unit are formed of passive elements.

8. The transmission line monitoring apparatus as claimed in claim 7, further comprising a timer for managing said first control unit at given intervals.

9. The transmission line monitoring apparatus as claimed in claim 8, further comprising a command detecting unit which detects a command signal included in said down data signal so as to manage said first control unit based on said command signal.

10. A transmission line monitoring apparatus monitoring faults occurring in a transmission line and in apparatus which are connected with the transmission line, said transmission line monitoring apparatus comprising:

a first optical coupling unit which couples a down data signal of a first wavelength and an examination signal of a second wavelength so as to transmit a first coupled signal to a lower apparatus;

a first optical dividing unit to demultiplex said first coupled signal from said optical coupling unit so as to divide and split said first coupled signal into said down data signal with the first wavelength and said examination signal with the second wavelength;

a second optical coupling unit which couples an up data signal with the first wavelength and said examination signal from said first optical dividing unit so as to transmit a second coupled signal toward a host apparatus;

a second optical dividing unit to demultiplex said second coupled signal from said second optical coupling unit so as to divide and split said second coupled signal into said up data signal with the first wavelength and said examination signal with the second wavelength;

a monitoring unit which monitors a fault and a location of said fault by using said examination signal with the second wavelength;

a first examination signal generator which generates said examination signal with the second wavelength; and a second control unit which controls start and stop of said alarm information output unit and start and stop of said alarm information display/transferring unit, and where said first optical coupling unit, said first optical dividing unit, said second optical coupling unit and said second optical dividing unit are formed of passive elements, and wherein said monitoring unit includes:

an alarm information output unit which monitors a signal level of said examination signal with the second wavelength and, if said signal level is lower than a predetermined signal level, then outputs alarm information, and an alarm information displaying/transferring unit which, when said alarm information is outputted, displays said alarm information and insert said alarm information into said up data signal to be transmitted to said host apparatus.

11. The transmission line monitoring apparatus as claimed in claim 10, further comprising a command detecting unit which detects a command signal included in said down data signal so as to manage said first control unit based on said command signal.

12. A transmission line monitoring method monitoring faults occurring in a transmission line and/or in an apparatus connected with the transmission line, said transmission line monitoring method comprising:

coupling a down data signal with a first wavelength and an examination signal with a second wavelength so as to transmit a first coupled signal to a lower apparatus;

demultiplexing said first coupled signal into said down data signal with the first wavelength and said examination signal with the second wavelength, and returning said examination signal;

coupling an up data signal with the first wavelength and said returned examination signal with the second wavelength so as to transmit a second coupled signal towards a host apparatus;

demultiplexing the second coupled signal into said up data signal with the first wavelength and said returned examination signal with the second wavelength; and monitoring a fault and an exact location of said fault by using said examination signal with the second wavelength and indicating said exact location of whether said fault occurs in the transmission line, the lower apparatus or the host apparatus, where the coupling and the demultiplexing operations are performed using a unit formed of passive elements that are operable without a power supply.

13. The transmission line monitoring method as claimed in claim 12, wherein said up data signal with the first wavelength includes at least a portion of said down data signal inserted therein.

14. A transmission line monitoring method monitoring faults occurring in a transmission line and/or in an apparatus connected with the transmission line, said transmission line monitoring method comprising:

generating an examination signal having a second wavelength from a data signal having a first wavelength;

coupling the data signal with the examination signal so as to transmit a first coupled signal from a host apparatus to a lower apparatus;

dividing and separating the first coupled signal into the data signal with the first wavelength and said examination signal with the second wavelength at the lower apparatus, and returning said examination signal;

coupling the data signal with the first wavelength and the returned examination signal with the second wavelength so as to transmit a second coupled signal from the lower apparatus to the host apparatus;

dividing and separating said second coupled signal into the data signal with the first wavelength and the returned examination signal with the second wavelength at the host apparatus; and monitoring a fault and an exact location of the fault by using the examination signal with the second wavelength generated from the data signal having the first wavelength and indicating said exact location of whether said fault occurs in the transmission line, the lower apparatus or the host apparatus, where the coupling and the dividing operations are performed using a unit formed of passive elements that are operable without a power supply.

15. A transmission line monitoring method monitoring faults occurring in a transmission line and/or in an apparatus connected with the transmission line, comprising:

controlling generation of an examination signal having a second wavelength and if the examination signal is generated, coupling a down data signal with a first wavelength to the examination signal with the second wavelength so as to transmit a first coupled signal to a lower apparatus;

separating the first coupled signal into said down data signal with the first wavelength and the examination signal with the second wavelength, and returning the examination signal;

coupling an up data signal with the first wavelength and the returned examination signal with the second wavelength so as to transmit a second coupled signal to a host apparatus;

separating the second coupled signal into said up data signal with the first wavelength and said returned examination signal with the second wavelength; and monitoring a fault and an exact location of said fault by using the examination signal with the second wavelength and indicating said exact location of whether said fault occurs in the transmission line, the lower apparatus or the host apparatus connected, where the coupling and the separating operations are performed using a unit formed of passive elements that are operable without a power supply.

16. The transmission line monitoring method as claimed in claim 15, wherein said up data signal with the first wavelength includes at least a portion of said down data signal inserted therein.

17. A transmission line monitoring method monitoring faults occurring in a transmission line and in apparatus connected with the transmission line, said transmission line monitoring method comprising:

transmitting a first coupled signal that includes a down data signal having a first wavelength and an examination signal having a second wavelength from a host apparatus to a lower apparatus, and returning the examination signal;

transmitting a second coupled signal that includes an up data signal with the first wavelength and the returned examination signal with the second wavelength from the lower apparatus to the host apparatus;

demultiplexing the first and the second coupled signals so as to split said first and second coupled signals; and monitoring a fault and an exact location of said fault by using the examination signal with the second wavelength and indicating said exact location of whether said fault occurs in the transmission line, the lower apparatus or the host apparatus, where the coupling and demultiplexing operations are performed using a unit formed of passive elements that are operable without a power supply.

18. The transmission line monitoring method as claimed in claim 17, wherein said up data signal with the first wavelength includes at least a portion of said down data signal inserted therein.

19. A method for monitoring fault occurring in a transmission line and in an apparatus connected with the transmission line, comprising:

sending a coupled signal from a source location over a transmission line where the coupled signal includes a signal having a first wavelength and an examination signal having a second wavelength;

demultiplexing the coupled signal at a second location to divide and split the signal having the first wavelength from the examination signal having the second wavelength;

returning the signal having the second wavelength to the source location over a second transmission line, the returned signal being coupled with a data signal from the apparatus; and monitoring a fault and an exact location of said fault using the returned signal having the second wavelength and indicating said exact location of whether said fault occurs in the transmission line or in the apparatus connected with the transmission line, where the coupling and the demultiplexing operations are performed using a unit formed of passive elements that are operable without a power supply.

20. The method for monitoring fault as claimed in claim 19, wherein said returned signal is coupled with at least a portion of the signal having the first wavelength.

21. A transmission line monitoring method, comprising:

transmitting a first coupled signal having a data signal of a first wavelength and an examination signal of a second wavelength;

demultiplexing the first coupled signal to split the data signal with the first wavelength from the examination signal of the second wavelength, and return the examination signal of the second wavelength;

transmitting a second coupled signal having the data signal with the first wavelength and the returned examination signal of the second wavelength; and demultiplexing the second coupled signal into the data signal with the first wavelength and the returned examination signal with the second wavelength, wherein a fault and an exact location of the fault is monitored using the examination signal with the second wavelength for indicating said exact location of whether said fault occurs in the transmission line or in an apparatus connected with the transmission line, where the coupling and the demultiplexing operations are performed using units formed of passive elements that are operable without a power supply.

22. The transmission line monitoring method as claimed in claim 21, wherein said second coupled signal includes another data signal with a first wavelength.

23. A method of monitoring a transmission line connecting a host apparatus with a terminal, comprising:

dividing a first coupled signal having a down data signal of a first wavelength and an examination signal of a second wavelength, and separately returning the examination signal of the second wavelength and at least a portion of the down data signal of the first wavelength;

inserting the returned portion of the down data signal into an up data signal with a first wavelength, and coupling the returned examination signal of the second wavelength with the up data signal to transmit a second coupled signal towards a host apparatus; and dividing the second coupled signal into the up data signal with the first wavelength and the examination signal with the second wavelength, where a fault and an exact location of the fault is monitored using the examination signal with the second wavelength for indicating said exact location of whether the fault occurred in the transmission line, the terminal, or the host apparatus is provided, and the dividing and the inserting operations are performed using a unit formed of passive elements operable without a power supply.

* * * * *

UNITED STATES PATENT AND TRADEMARK OFFICE
CERTIFICATE OF CORRECTION

PATENT NO. : 7,369,764 B1
APPLICATION NO. : 09/441083
DATED : May 6, 2008
INVENTOR(S) : Kiyoshi Sukegawa et al.

It is certified that error appears in the above-identified patent and that said Letters Patent is hereby corrected as shown below:

Column 14, Line 27, after "signals" insert --,--.

Signed and Sealed this

Thirtieth Day of September, 2008

JON W. DUDAS
*Director of the United States Patent and Trademark Office*